US012540021B2

(12) United States Patent
Shi et al.

(10) Patent No.: US 12,540,021 B2
(45) Date of Patent: Feb. 3, 2026

(54) PACKAGE SYSTEM FOR ARTICLE

(71) Applicant: The Procter & Gamble Company, Cincinnati, OH (US)

(72) Inventors: Fukuan Shi, Guangzhou (CN); Yuen Sin Cheong, Beijing (CN); Gautam Bhattacharjee, Beijing (CN); Dongpo Huang, Beijing (CN)

(73) Assignee: The Procter & Gamble Company, Cincinnati, OH (US)

( * ) Notice: Subject to any disclaimer, the term of this patent is extended or adjusted under 35 U.S.C. 154(b) by 541 days.

(21) Appl. No.: 18/052,970

(22) Filed: Nov. 7, 2022

(65) Prior Publication Data

US 2023/0150747 A1 May 18, 2023

(30) Foreign Application Priority Data

Nov. 16, 2021 (WO) ................ PCT/CN2021/130933

(51) Int. Cl.
*B65D 81/03* (2006.01)
*A61F 13/551* (2006.01)
*B65D 65/46* (2006.01)
*B65D 71/06* (2006.01)
*B65D 81/02* (2006.01)
*B65D 85/00* (2006.01)

(52) U.S. Cl.
CPC .......... *B65D 81/03* (2013.01); *B65D 65/466* (2013.01); *B65D 71/063* (2013.01); *B65D 81/022* (2013.01); *B65D 85/70* (2013.01); *A61F 13/5511* (2013.01); *A61F 13/55145* (2013.01); *B65D 2565/385* (2013.01); *B65D 2565/387* (2013.01); *B65D 2571/00672* (2013.01); *B65D 2581/055* (2013.01)

(58) Field of Classification Search
CPC .... B65D 81/03; B65D 65/466; B65D 71/063; B65D 81/022; B65D 85/70; B65D 2581/055; B65D 2565/387; B65D 2565/385; B65D 2571/00672; A61F 13/55145; A61F 13/5511
USPC ......................................... 206/439
See application file for complete search history.

(56) References Cited

U.S. PATENT DOCUMENTS 7,491,777 B2  2/2009  Jakob
10,350,140 B2  7/2019  Matoba
(Continued)

FOREIGN PATENT DOCUMENTS

CN   109292257 A   2/2019
CN   109775135 A   5/2019
(Continued)

OTHER PUBLICATIONS

PCT Search Report and Written Opinion for PCT/CN2021/130933 dated May 20, 2022, 13 pages.

*Primary Examiner* — Rafael A Ortiz
(74) *Attorney, Agent, or Firm* — Daniel S. Albrecht

(57) ABSTRACT

The present disclosure relates to a system comprising at least one primary package accommodating at least one article, and a secondary package accommodating the primary package, wherein the secondary package comprises a second package material having a water vapor transmission rate lower than about 100 g/m²/day, as measured according to Water Vapor Transmission Rate Test, and a resistance to compression higher than about 150N.

18 Claims, 21 Drawing Sheets

(56) References Cited

U.S. PATENT DOCUMENTS

| | | |
|---|---|---|
| 2005/0031816 A1 | 2/2005 | Chang et al. |
| 2005/0208243 A1 | 9/2005 | Chambers et al. |
| 2007/0148384 A1* | 6/2007 | Bowden ............... B29C 63/0065 428/35.7 |
| 2009/0150733 A1 | 6/2009 | Takizawa |
| 2009/0157033 A1 | 6/2009 | Toro et al. |
| 2017/0225427 A1 | 8/2017 | Tilton |
| 2020/0024049 A1* | 1/2020 | Borrero ................. B65D 81/03 |
| 2020/0024058 A1* | 1/2020 | Clare ..................... B65D 75/04 |
| 2020/0140178 A1 | 5/2020 | Abe |
| 2020/0262175 A1 | 8/2020 | Decoste et al. |
| 2020/0407137 A1 | 12/2020 | Achkar |
| 2021/0269212 A1 | 9/2021 | Schertzer |
| 2021/0284420 A1* | 9/2021 | Borrero ................ B65D 81/052 |
| 2022/0031532 A1* | 2/2022 | Remus ................. A61F 13/551 |
| 2022/0185568 A1 | 6/2022 | Borrero et al. |
| 2022/0242651 A1 | 8/2022 | Ros |
| 2023/0399595 A1 | 12/2023 | Hamersky et al. |

FOREIGN PATENT DOCUMENTS

| | | | |
|---|---|---|---|
| CN | 208932077 U | 6/2019 | |
| CN | 209177254 U | 7/2019 | |
| CN | 209535939 U | 10/2019 | |
| CN | 112078964 A | 12/2020 | |
| CN | 112110038 A | 12/2020 | |
| CN | 212767663 U | 3/2021 | |
| EP | 1033955 A1 * | 9/2000 | ........ A61F 13/15211 |
| EP | 3611111 A1 | 2/2020 | |
| JP | 2005112447 A | 4/2005 | |
| JP | 2014005077 A | 1/2014 | |
| JP | 2020193006 A | 12/2020 | |
| WO | 9926574 A1 | 6/1999 | |

* cited by examiner

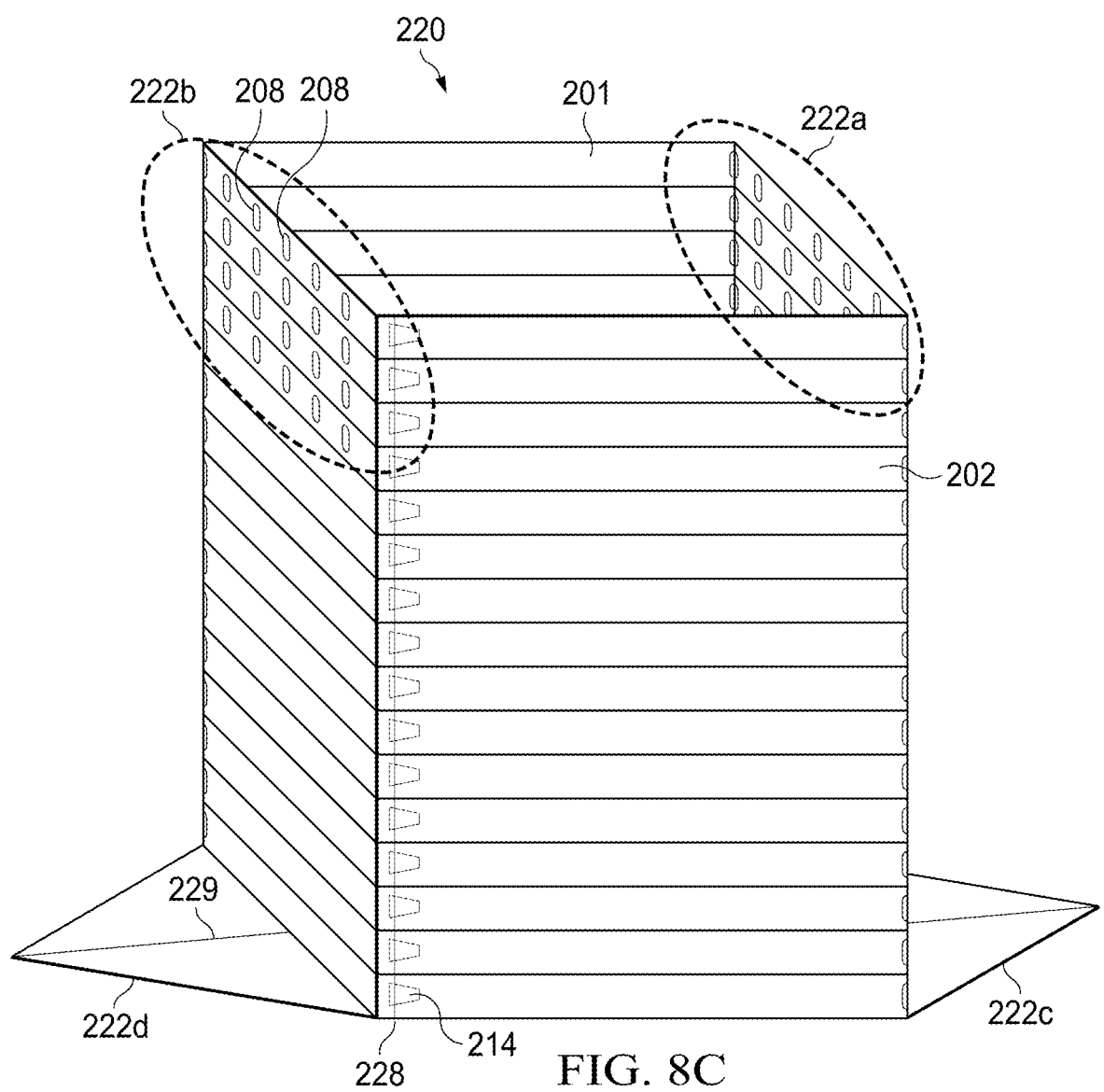

PACKAGE SYSTEM FOR ARTICLE

CROSS REFERENCE TO RELATED APPLICATION

This application claims priority under 35 U.S.C. § 119 to Chinese PCT Patent Application Serial No. PCT/CN2021/130933, filed on Nov. 16, 2021, the entire disclosure of which is hereby incorporated by reference.

FIELD

The present invention pertains to an environment friendly package system.

BACKGROUND

Products which are environmentally friendly are at the forefront of many consumer's minds these days. There is an increased focus on products which are sustainably sourced. For example, there is a strong desire in the marketplace to create consumer products which comprise natural materials, bio-sourced materials, and/or recycled materials. On the disposal end, there is an increased focus on products which are biodegradable, compostable, recyclable, reusable, and/or otherwise cause minimal landfill waste.

In the context of disposable absorbent articles, at least one article is accommodated in a primary package or on shelf package, and at least one primary package is accommodated in a secondary package for transportation and storage.

Where articles are capable of forming a shelf stable surface, a flexible material is often used. In some cases, plastic is preferred over carton board because plastic can withstand the rigors of a packaging process much more so than carton board given the plastic's ability to flex and stretch. Additionally, plastic may exhibit barrier properties protecting the articles within the plastic packaging from environmental moisture. One of common primary package is a polyethylene film bag. An alternative to a polyethylene film bag, primary packages made by a naturally biodegradable material ("NBM") such as polyvinyl alcohol, paper, etc. gets degraded in natural condition (soil, municipal water, marine) and can reduce the environment pressure and delight consumer with improved sustainability. It is desirable for biodegradable materials to resist many environmental factors during application period, but to be biodegradable under disposal conditions. However, the NBM typically has a low moisture barrier to protect articles inside from moisture pick-up.

To ship primary packages to retailers or consumers, secondary packages may be utilized. Secondary packages typically comprise a plurality of primary packages therein. In order to reduce the rate at which moisture is absorbed by articles such as absorbent articles, these secondary packages may be preferred to provide with a film layer either internally and/or externally.

There are secondary package materials which already satisfy some criteria. Examples of secondary packages include a paper box, and a paper box laminated with a plastic film layer disposed on an inner and/or outer surface of the paper box to reinforce barrier properties of the paper box. Though the film layer may be recyclable, it should be separated from the paper box before recycling. Carton board packages, as carton board is derived from wood pulp, may be one or both sustainably sourced and recyclable, but it is vulnerable to external damages and provide a very low moisture barrier. Plastic film bag is light in weight and thus save energy for transportation than carton board based secondary package, but it does not have desirable mechanical properties to withstand the rigors of a packaging process, and transportation.

As an example, many absorbent articles on the market utilize super absorbent polymers within their absorbent systems. These super absorbent polymers are designed to rapidly absorb and contain liquid insults to the absorbent article. Unfortunately, these super absorbent polymers can also be very effective at absorbing liquid vapor, i.e. moisture from the environment. This absorbent moisture from the environment can be problematic, particularly where the absorbent articles comprise wetness indicators. Some types of absorbent articles such as baby diapers have wetness indicators which are utilized by caregivers and potentially wearers to identify when the absorbent article has absorbent a liquid insult. Where the absorbent articles are allowed to absorb moisture from the environment without any barrier inhibiting such absorption, these wetness indicators can become activated while still in the package.

E-commerce growing fast a modern logistic transport industry requires packages to be lightweight to save the courier fee and energy and still mechanically strong to be resistant to damage like punctures for physical protection of a primary package and articles inside during transportation.

There is a growing public demand for a package system which can enhance a recycling efficiency of package materials.

In addition, there is a growing public demand for a package system which exhibits sufficient barrier properties and mechanical strengths.

SUMMARY

The present invention provides a package system comprising at least one primary package accommodating at least one article, and a secondary package accommodating the primary package, wherein the secondary package comprises a second package material having a water vapor transmission rate lower than about 100 $g/m^2/day$ as measured according to Water Vapor Transmission Rate Test, and a resistance to compression higher than about 150N.

The present invention provides a package system comprising a primary package accommodating at least one article, and a secondary package accommodating the primary package, wherein the primary package comprises a biodegradable material, a recyclable material or a combination thereof, and wherein the secondary package has a water vapor transmission rate lower than about 100 $g/m^2/day$ as measured according to Water Vapor Transmission Rate Test, and a resistance to compression higher than about 150N.

For ease of discussion, the invention disclosed herein may be discussed with reference to the numerals referred to in figures. The figures and detailed description should however not be considered limiting the scope of the claims, unless explicitly indicated otherwise, and the invention disclosed herein is suitable to package a wide variety of product.

BRIEF DESCRIPTION OF THE DRAWINGS

FIG. 8C shows an air-inflated package with an open end from the pouch-like structure in FIG. 8B.

DETAILED DESCRIPTION

Figure 1A:
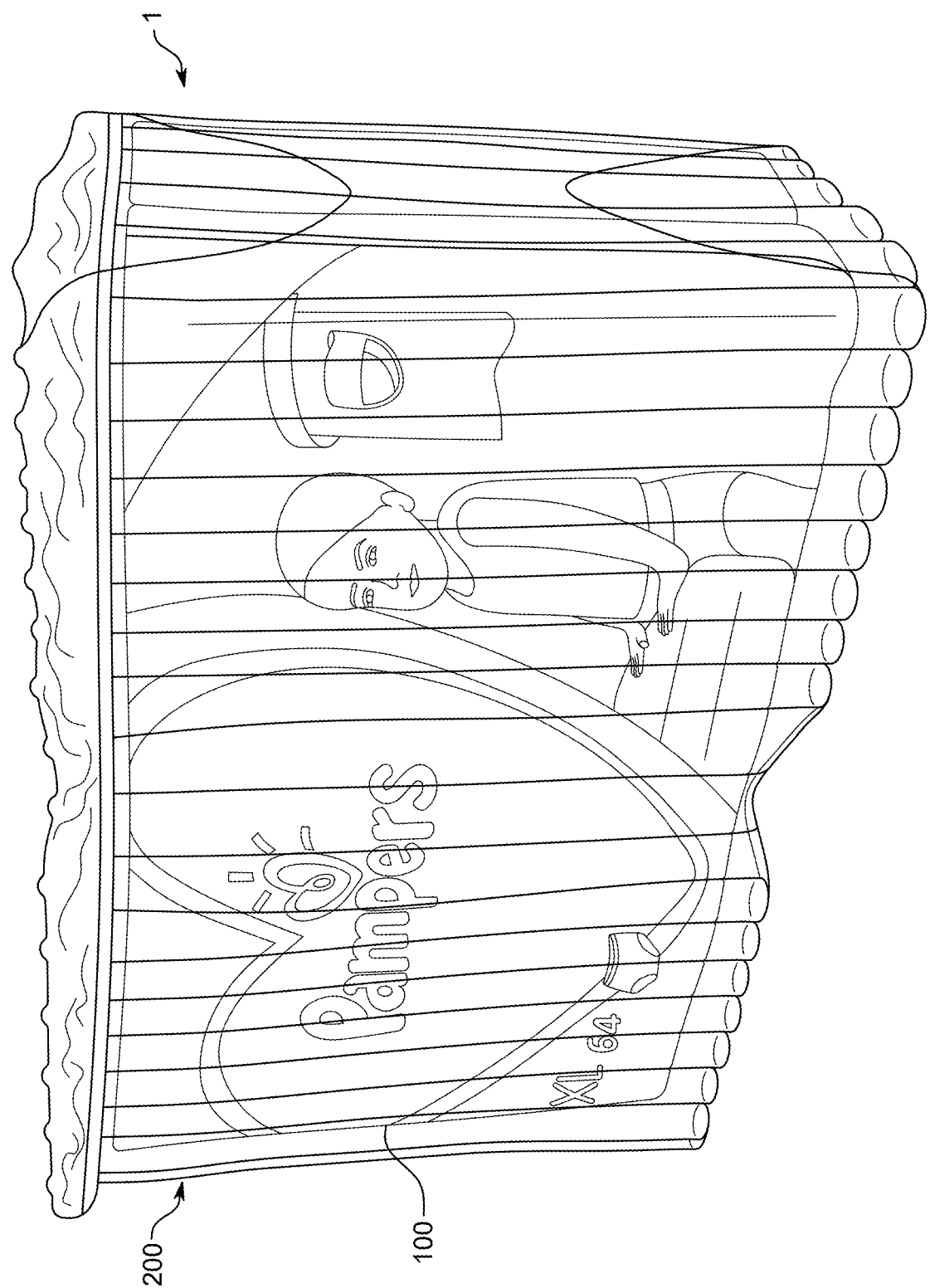
FIG. 1A shows a perspective view of an exemplary package system of the present invention.
Figure 1B:
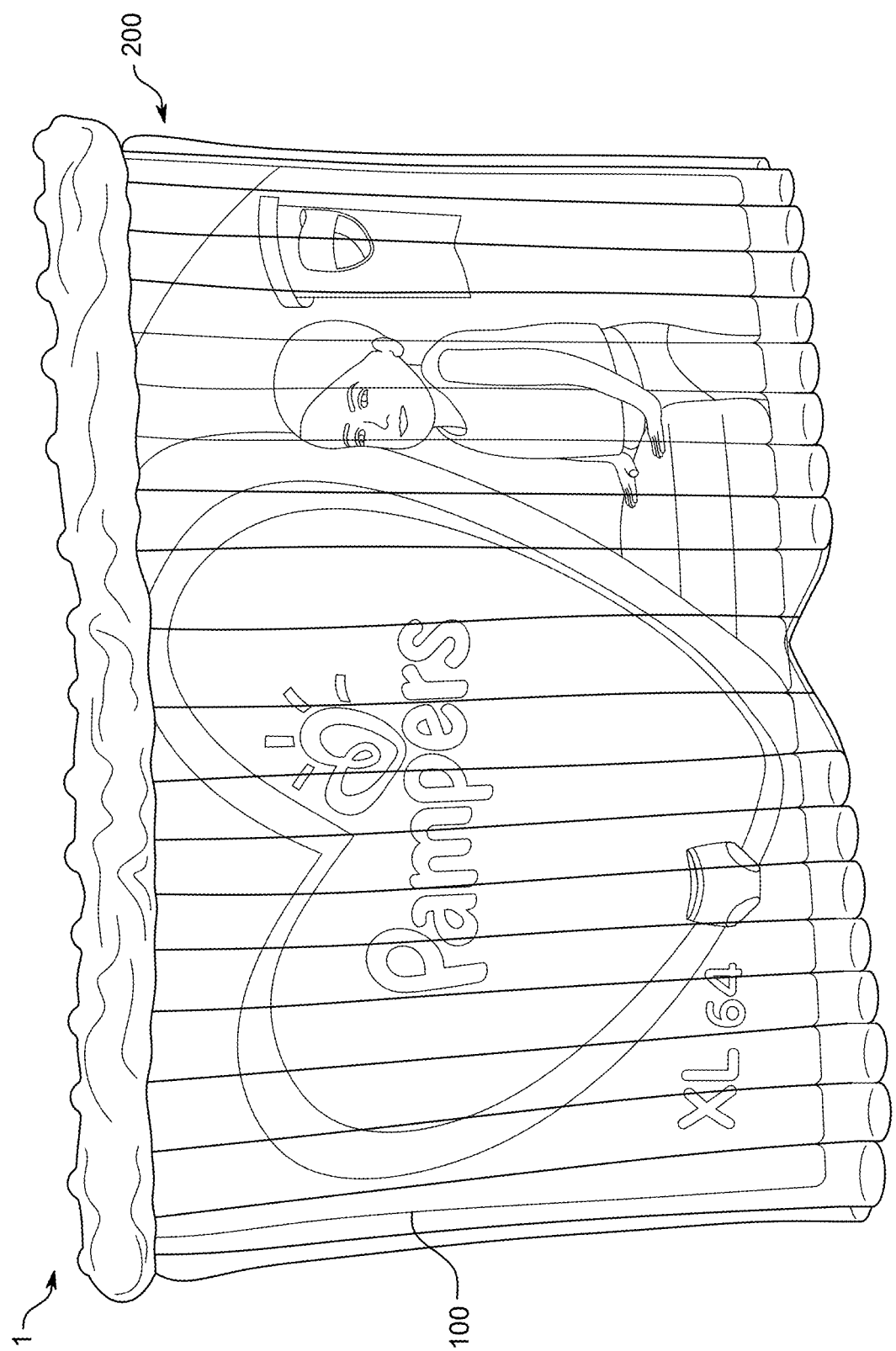
FIG. 1B shows a front view of the package system of FIG. 1A.
Figure 1C:
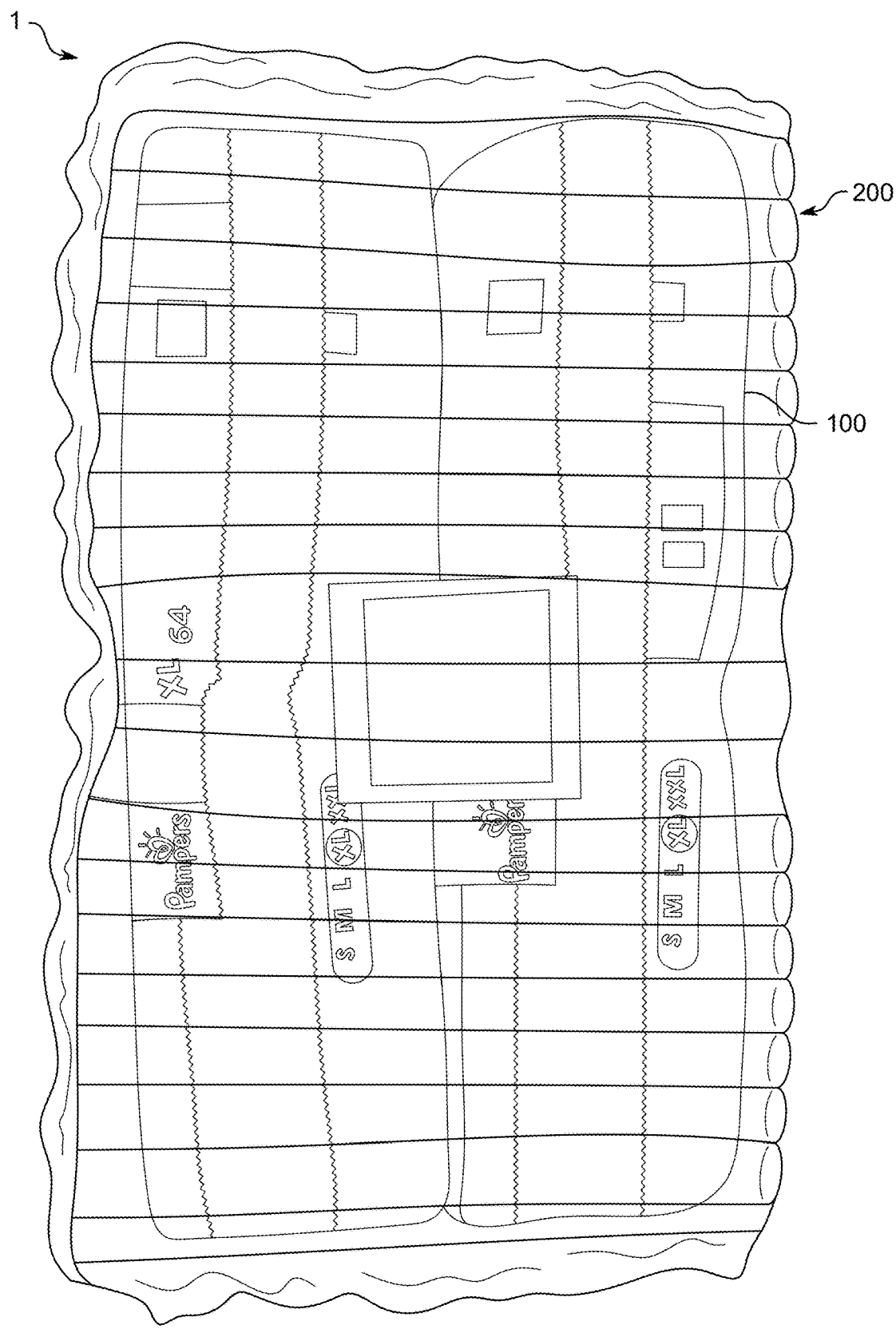
FIG. 1C shows a top view of the package system of FIG. 1A.
Figure 1D:
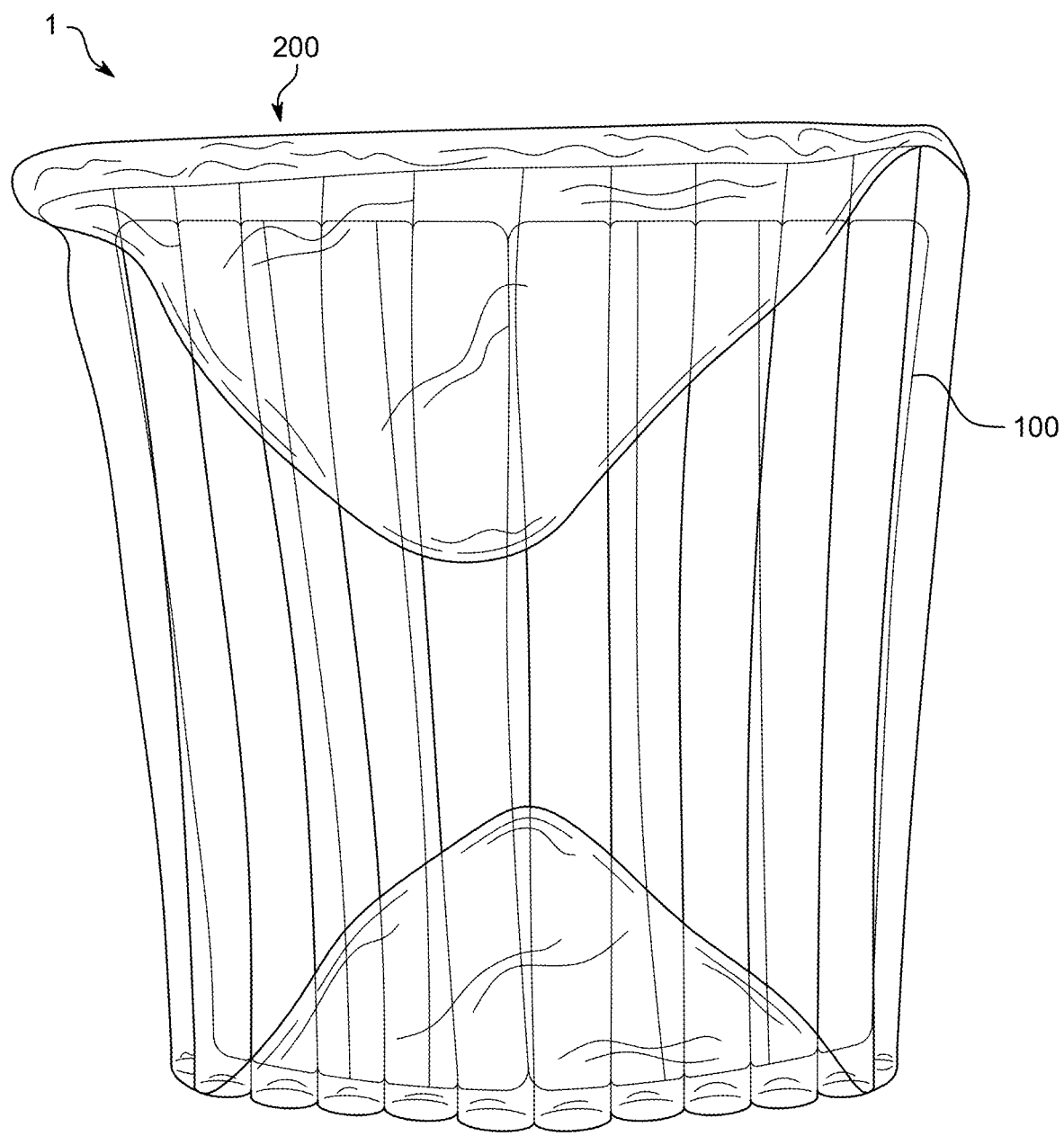
FIG. 1D shows a side view of the package system of FIG. 1A.

The term "absorbent article" as used herein refers to devices which absorb and contain exudates, and, more specifically, refers to devices which are placed against or in proximity to the body of the wearer to absorb and contain the various exudates discharged from the body. Absorbent articles of the present invention include, but are not limited to, diapers, adult incontinence briefs, training pants, swim pants, diaper holders, diaper outer covers, absorbent inserts for the diaper outer covers, menstrual pads, incontinence pads, liners, pantiliners, tampons, durable menstrual pants, and the like.

The term "biodegradable", as used herein, means a material or package is able to decompose naturally. Biodegradable materials may degrade into simple stable compounds relatively quickly as a result of the action of bacteria and break down into elements such as carbon that are recycled naturally. Biodegradable packages may be made of biodegradable materials as a major component of the packages. The term "biodegradable" may refer to materials that can achieve the biodegradation percentage higher than 90% within 6 months absolutely or relatively to the reference according to ISO 17556.

The term "cellulose-based fibers," as used herein, may include cellulose fibers such as wood fiber, cotton, regenerated cellulose fiber such viscose, lyocell, rayon or cuprammonium rayon, and high pulping yield fibers, unless specified differently. The term "cellulose-based fibers" also includes chemically treated natural fibers, such as mercerized pulps, chemically stiffened or crosslinked fibers, or sulfonated fibers. Also included are mercerized natural fibers, regenerated natural cellulosic fibers, cellulose fibers produced by microbes, the rayon process, cellulose dissolution and coagulation spinning processes, and other cellulosic material or cellulosic derivatives. Other cellulose-based fibers included are paper broke or recycled fibers and high yield fibers. High yield pulp fibers are those fibers produced by pulping processes providing a yield of about 65% or greater, more specifically about 75% or greater, and still more specifically about 75% to about 95%. Yield is the resulting amount of processed fibers expressed as a percentage of the initial wood mass. Such pulping processes include bleached chemithermomechanical pulp (BCTMP), chemithermomechanical pulp (CTMP), pressure/pressure thermomechanical pulp (PTMP), thermomechanical pulp (TMP), thermomechanical chemical pulp (TMCP), high yield sulfite pulps, and high yield Kraft pulps, all of which leave the resulting fibers with high levels of lignin but are still considered to be natural fibers. High yield fibers are well known for their stiffness in both dry and wet states relative to typical chemically pulped fibers.

The term "cross-machine direction" or "CD", as used herein, refers to the path that is perpendicular to the machine direction in the plane of a material such as a film.

The term "machine direction" or "MD", as used herein, refers to the path that material, such as a film, follows through a manufacturing process.

The term "natural fibers" as used herein, refers to fibers which comprise cellulose-based fibers, bamboo based fibers, and the like. Natural fibers also refers to nonwoody fibers, such as cotton, abaca, kenaf, sabai grass, flax, esparto grass, straw, jute hemp, bagasse, milkweed floss fibers, and pineapple leaf fibers; and woody, wood, or pulp fibers such as those obtained from deciduous and coniferous trees, including softwood fibers, such as northern and southern softwood kraft fibers; hardwood fibers, such as *eucalyptus*, maple, birch, and aspen. Pulp fibers can be prepared in high-yield or low-yield forms and can be pulped in any known method, including kraft, sulfite, high-yield pulping methods and other known pulping methods. The natural fibers may be recycled natural fibers, virgin natural fibers or mixes thereof.

A package system according to the present invention comprises at least one primary package accommodating at least one article, and a secondary package accommodating the primary package. The package system of the present invention can be more effectively recycled.

The primary packages and/or the secondary packages of the present invention can be in a myriad of configurations containing one or more articles. For example, the primary package and/or the secondary packages may comprise a plurality of panels, including a consumer-facing panel, i.e., front panel. A consumer-facing panel in a primary package is the face of the primary package, when on shelf, that faces the consumer. In general, the consumer-facing panel comprises branding and/or package information, each of which is described in additional detail herein. A consumer-facing panel in a secondary package is the face of the secondary package corresponding to the consumer-facing panel of the primary package when the primary package is inside the secondary package.

FIGS. 1A-1D show a perspective view, a front view, a top view and a side view of an exemplary package system 1 according to the present invention, respectively. The package system 1 comprises a primary package 100 comprising at least one article and a secondary package 200.

A package system of the present invention may comprise at least one primary package accommodating at least one article, and a secondary package accommodating the primary package, wherein the secondary package has a resistance to compression higher than about 150N and has a puncture resistance higher than about 7 Joules as measured according to Puncture Resistance Test.

A package system of the present invention may comprise at least one primary package accommodating at least one article, and a secondary package accommodating the primary package, wherein the secondary package has a water vapor transmission rate lower than 100 g/m²/day as measured according to Water Vapor Transmission Rate Test, and has a basis weight of from about 80 gsm to about 220 gsm.

A package system of the present invention may comprise at least one primary package accommodating at least one article, the primary package comprising a material exhibiting a water vapor transmission rate higher than 200 g/m²/day as measured according to Water Vapor Transmission Rate Test, and a secondary package accommodating the primary package, wherein the primary package exhibits a moisture pick-up less than 2%, as measured according to Moisture Pick-up test.

A package system of the present invention may comprise at least one primary package accommodating at least one article, the primary package having an MD tensile strength no less than about 0.55 N/mm as measured according to Tensile Strength Test, and a secondary package accommodating the primary package, wherein the secondary package has a resistance to compression higher than about 150N and has a puncture resistance higher than about 7 Joules as measured according to Puncture Resistance Test.

A package system of the present invention may comprise at least one primary package accommodating at least one article, the primary package having a moisture pick-up less than 2%, as measured according to Moisture Pick-up test, and a secondary package accommodating the primary package, wherein the secondary package has a puncture resistance higher than about 7 Joules as measured according to Puncture Resistance Test.

In one embodiment, the package system of the present invention comprises a primary package comprising a biodegradable material, a recyclable material, or a combinations thereof. In another embodiment, the package system of the present invention comprises a primary package comprising a recyclable material and the secondary package comprising a recyclable material. In another embodiment, the package system of the present invention comprises a primary package comprising a biodegradable material and the secondary package comprises a recyclable material. In another embodiment, the package system of the present invention comprises a primary package comprising a biodegradable material and the secondary package comprises an air-inflated film material recyclable material. In another embodiment, the package system of the present invention comprises a primary package comprising a recyclable material and the secondary package comprises an air-inflated film material.

Primary Package

A primary package in the present invention can be any package which can accommodate at least one article.

The primary package in the present invention may be formed from one or more sheets of plastic film. "Film" means a sheet structure having a length, width and caliper (caliper), wherein each of the length and width greatly exceed the caliper, i.e., by a factor of 1,000 or more, the structure having one layer (monolayer) or more respectively adjacent layers (multilayer), each layer being a substantially continuous structure formed of one or more thermoplastic polymer resins (including blends thereof). The film may be a single layer (monolayer), or may have two, three or more layers (multilayer).

The plastic film may comprise base polymers such as polyolefins including polyethylenes, polypropylenes, polybutadienes, polypropylene-ethylene interpolymer and copolymers having at least one olefinic constituent, and any mixtures thereof. The film may comprise small amounts of one or more additives. Some non-limiting examples of classes of additives contemplated include perfumes, dyes, pigments, nanoparticles, antistatic agents, fillers, and combinations thereof.

The plastic film may comprise non-biodegradable polymers.

Examples of non-biodegradable options include polyolefin materials, for example: polyethylene (PE), polypropylene (PP), and polyethylene terephthalate (PET). Examples of polyethylene could include high density polyethylene, low density polyethylene, linear low density polyethylene, medium density polyethylene—including all homopolymers and copolymers of those materials. Other examples of non-biodegradable options could include various Surlyn's; copolymers of styrene-butadiene e.g. acrylonitrile-butadiene; acrylic copolymers; acrylate copolymers (including methyl methacrylate); acetate copolymers including EVA (ethylene vinyl acetate). The polymers could in some cases include fillers additives such as clays (e.g. kaolin) and other mineral additives such as $CaCO_3$ or $TiO_2$.

The plastic film may comprise biodegradable polymers. In one embodiment, the plastic film may be biodegradable. Some examples of biodegradable options include aliphatic aromatic polyesters (e.g., ECOFLEX® from BASF), certain thermoplastic starches (e.g., MATER-BI from Novamont's or PLANTIC® from Plantic/Kuraray), polybutylene succinate and copolymers thereof (e.g., BIONOLLE® from ShoWa High polymer Co. or PBSA from Mitsubishi Chemicals), polycaptralactone and mixtures thereof. Other suitable polymers include polhydroyxalkoanates (PHA) and PHA copolymers such as poly(beta-hydroxyalkanoate), poly(3-hydroxybutyrate-co-3-hydroxyhexanoate) NODAX™ from Danimer, and poly(3-hydroxybutyrate-co-3-hydroxyhexanoate) from Kaneka. Other PHA copolymers can by synthesized by methods known to one skilled in the art, such as, from microorganisms, the ring-opening polymerization of beta-lactones, the dehydration-polycondensation of hydroxyalkanoic acid, and the de-alcoholization-polycondensation of the alkyl ether of hydroxyalkanoic acid, as described in Volova, "Polyhydroxy Alkanoates Plastic Materials of the 21" Century: Production, Properties, and Application, Nova Science Publishers, Inc., (2004), incorporated herein by reference. Another examples are polylactic acid (PLA), polyvinyl alcohol (PVA), polyglycol acid, polypropylene carbonate and copolymers thereof. The biodegradable primary package can be degraded by micro-organisms and thus brings less burden to the environment than the non-degradable primary package.

Properties of a first package material is considered properties of a first package made by the first package material.

When the primary package comprises a film material, the film may exhibit a caliper of at least 40 μm, or at least 50 μm, or at least 60 μm, specifically reciting all values within these ranges and any ranges created thereby, thus the material can ensure the perception of good quality intuitively by consumers. The caliper is measured using ISO 534 as modified herein.

The primary package of the present invention may have a MD tensile strength of at least 0.55 N/mm, or at least 0.7 N/mm, or at least 0.9 N/mm to survive on the high speed packing line.

In a primary package, the MD tensile strength is a tensile strength in the MD direction of the package material, or a tensile strength in the direction from a top panel to a bottom panel of the primary package.

It is worth noting that the film may be laminated, coated, or otherwise joined to an additional layer such as a paper layer, a metal layer, and a metallization layer. A paper layer herein intends to include a paper layer made from natural fibers, synthetic fibers or any combination thereof. A metal layer herein tends to include foils such as made from aluminum, copper and other suitable metals or alloys. A metallization layer herein intends to include a polymeric film with a thin layer of metals or oxidization of metals via suitable metallization processes, such as vacuum metallization or spattering metallization, etc.

The primary package in the present invention may be formed from paper. "Paper", used herein related to a paper sheet intends to include synthetic fibers as well as natural fibers such as cotton, silk, wool, hemp, pulp, and the like; or reclaimed fibers such as rayon, cupra. For example, the paper layer comprises cellulose-based fibers. The term "cellulose-based fibers", as used herein, intends to include both cellulose fibers such as pulp and cotton, and regenerated cellulose fiber such as rayon unless specified differently. Synthetic paper may be manufactured from a composition comprising plastic fibers such as polyethylene and polypropylene and the like.

In one embodiment, the primary package in the present invention comprises a biodegradable package material. Biodegradable package materials include biodegradable polymers and natural fibers. Biodegradable package materials may be materials that can achieve the biodegradation percentage higher than 90% within 6 months absolutely or relatively to the reference according to ISO 17556. In another embodiment, the primary package in the present invention is biodegradable.

The primary package may comprise a package material comprising natural fibers. The package material may comprise at least 50 percent by weight natural fibers, or at least 70 percent by weight natural fibers, or at least 90 percent by weight natural fibers, specifically reciting all values within these ranges and any ranges created thereby. As yet another example, the package material may comprise 95 percent by weight natural fibers. The package materials of the present invention may comprise between 50 percent by weight to 100 percent by weight natural fibers, or between 70 percent by weight to 99.9 percent by weight, or between 90 percent by weight to 99.9 percent by weight natural fibers. It is worth noting that where the weight percentage of natural fibers is less than 100 percent, there is room for coatings, colorants, films and/or adhesives, if desired. The basis weight of the package material comprising natural fibers can have a basis weight of from between 50 gsm to 120 gsm, or between 60 to 105 gsm, or between 70 to 90 gsm, specifically reciting all values within these ranges and any ranges created thereby. The basis weight can be determined according to ISO 536 as modified herein.

The primary package may comprise a package material which is recyclable. Regarding the recyclability of a package material, there is no uniform standard which determines the recyclability of a material. In general, the higher the percent yield of natural material, the more likely the material is able to be recycled in traditional paper recycling channels.

In order to increase the likelihood that the package materials are recyclable, the total weight percentage of non-recyclable material, e.g. adhesives, film, coatings and/or colorants, in the package material of the present disclosure may be carefully selected. For example, the package material of the present disclosure may comprise 50 percent by weight or less, 30 percent by weight or less, or about 15 percent by weight or less of non-recyclable material, specifically including all values within these ranges and any ranges created thereby. As another example, the package materials of the present disclosure may comprise from between about 0.1 percent to about 50 percent by weight, from about 0.1 percent to about 30 percent by weight, or from about 0.1 percent to about 15 percent by weight of non-recyclable material, specifically including all values within these ranges and any ranges created thereby. If increased likelihood of recyclability is desired, the weight percentage of non-recyclable materials can be 5 percent by weight or less, or between 0.1 percent to 5 percent by weight, specifically reciting all values within these ranges and any ranges created thereby.

The effectiveness of the recycling process on the package materials of the present disclosure may be determined via recyclable percentage. Package materials of the present disclosure can exhibit recyclable percentages of 60 percent or greater, 80 percent or greater, or 90 percent or greater, specifically reciting all values within these ranges and any ranges created thereby. The packaging materials of the present disclosure can have a recyclable percentage of between 60 percent to about 99.9 percent, more preferably from about 80 percent to about 99.9 percent or most preferably from about 90 percent to about 99.9 percent, specifically reciting all values within these ranges and any ranges created thereby. In one specific example, the package materials of the present disclosure may exhibit a recyclable percentage of from about 90 percent to about 99.9 percent, more preferably from about 94 percent to about 99.9 percent or most preferably from about 96 percent to about 99.9 percent, specifically including all values within these ranges and any ranges created thereby. The recyclable percentage of the package materials of the present disclosure can be determined via test PTS-RH:021/97 (Draft October 2019) under category II, as performed by Papiertechnische Stiftung located at Pirnaer Strasse 37, 01809 Heidenau, Germany.

The primary packages of the present invention may comprise a generally cuboid shape. So, in addition to the consumer-facing panel, the primary packages of the present invention may further comprise a back panel opposing the consumer-facing panel, a left panel disposed between the consumer-facing panel and the back panel, a right panel opposing the left panel, a bottom panel disposed between the consumer-facing panel and the back panel, and an opposing top panel. Other package shapes are contemplated. Additional examples are contemplated where package shapes comprising less than six panels are formed. Building on these examples, primary packages having a circular or semi-circular shape when viewed from a bottom panel are contemplated. Additionally, primary packages having a triangular shape when viewed from the bottom panel are contemplated.

Figure 2A:
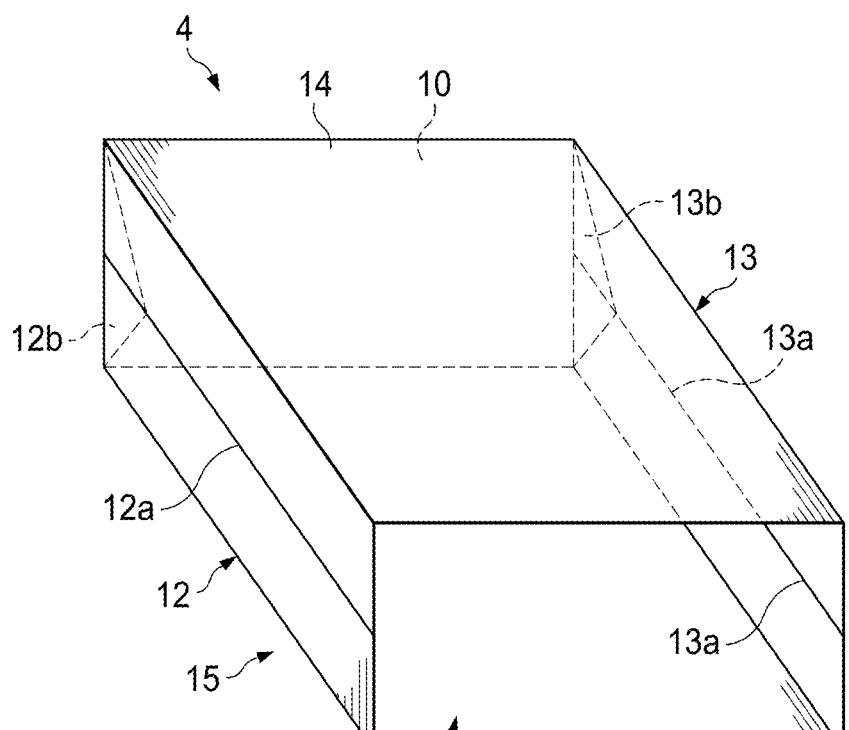
FIG. 2A is a schematic representation of an exemplary primary package in an open state.
Figure 2B:
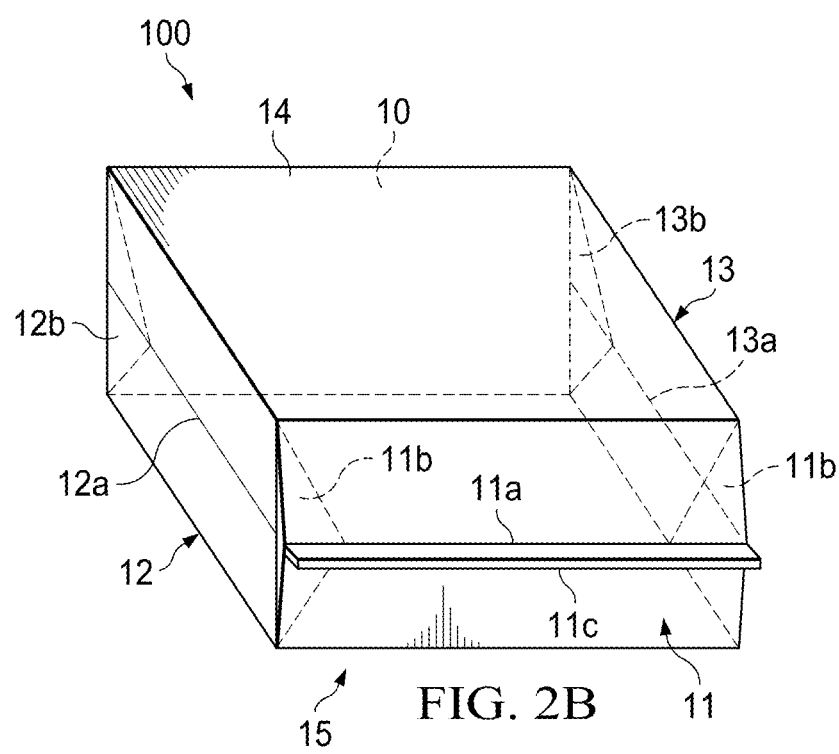
FIG. 2B is a schematic representation of an exemplary primary package.
Figure 2C:
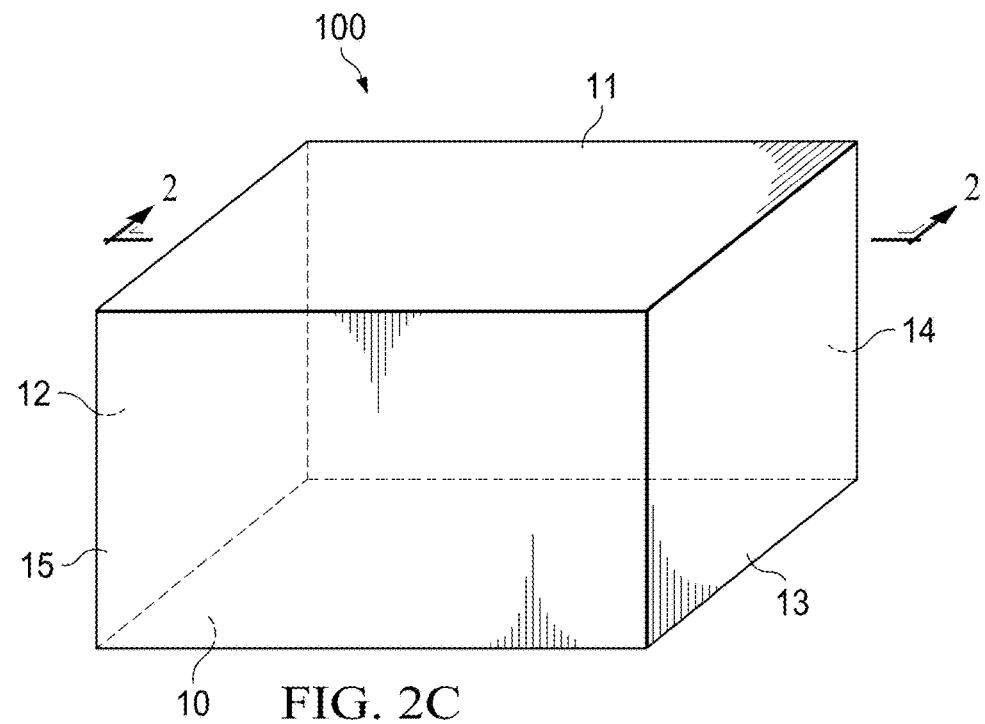
FIG. 2C is a schematic representation of another primary package.

In one embodiment, the primary package is made of a plastic film. Referring now to FIGS. 2A-2C, the sheet of packaging material may be suitably folded to form bag side creases 12b and 13b and two side folds 12a and 13a on opposite sides, to form the bag structure 4 having a first surface 10, a second and third surface 12, 13, respectively, and a fourth and a fifth surface 14, 15. An open end 48 (e.g., a gusseted bag structure) opposes the first surface 10. Each side crease 12b, 13b is located at the respective second or third surface 12, 13. It is worth noting that in FIGS. 2A and 2B, the crease and folds shown are for a package having a block configuration or block bottom configuration. As may be appreciated from FIG. 2B, the open end 48 opposite first surface 10 may then be closed to form the sixth surface 11. Any suitable style of closing may be utilized. As an example, the sixth surface may comprise closing gussets 11b by bringing edges of the bag 4 together and bonding them together to form a closing seam 11a and a closing seam fin 11c extending from the closing seam 11a, and sixth surface 11. In yet another example, the sixth surface may comprise seams which are joined together in a block style configuration or cross style configuration discussed hereafter. Referring back to FIGS. 2A-2C, the bag 4 and primary package 100 dimensions may be suitably selected and effected through design, folding, stacking, compression and packaging processes so that the primary package 1 retains the absorbent articles therein and maintains a neat, stable, a substantially parallelepiped-shape, i.e. a cuboid shape of the primary package 100.

Figure 3:
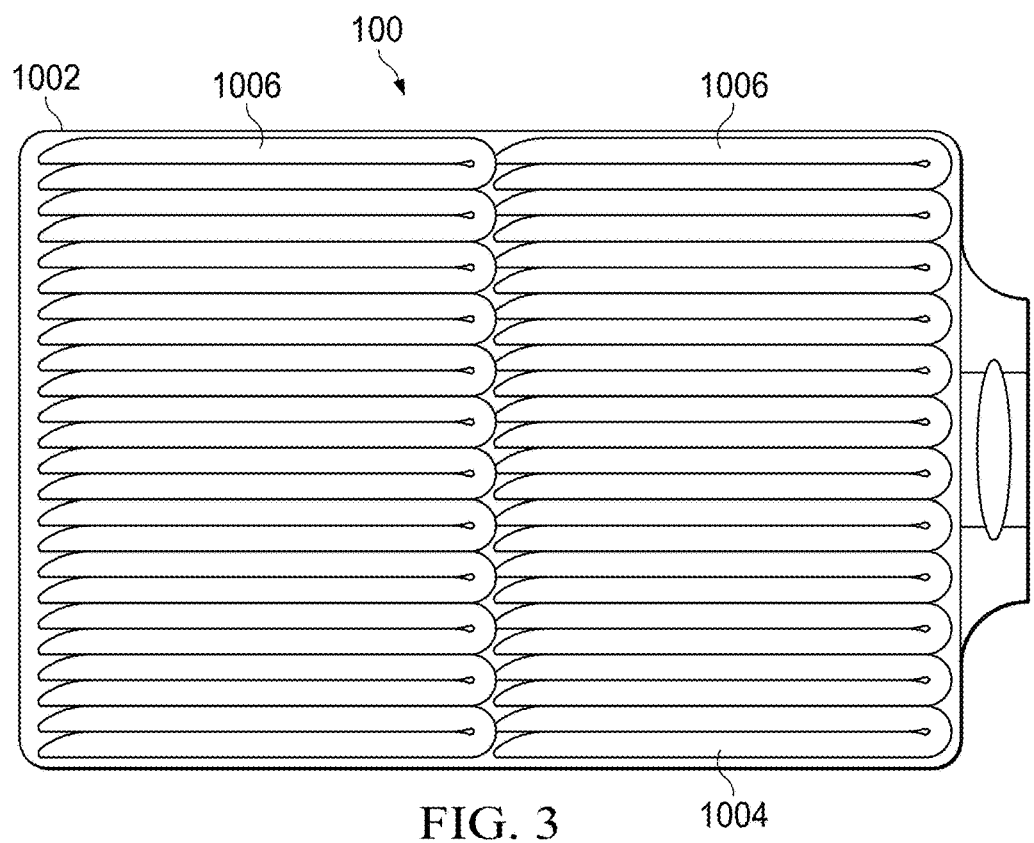
FIG. 3 is a schematic cross section view of the package of FIG. 2B containing absorbent articles showing absorbent articles therein.

The primary package of the present invention accommodates at least one article. The primary package of the present invention may accommodate a plurality of compressed articles, e.g. compressed disposable absorbent articles. For example, primary packages of the present invention may be used for accommodating feminine hygiene pads. As shown in FIG. 3, the primary package 100 defines an interior space 1002 in which a plurality of absorbent articles 1004 are situated. The plurality of absorbent articles 1004 may be arranged in one or more stacks 1006. The absorbent articles may be packed under compression so as to reduce the size of the packages, while still providing an adequate amount of absorbent articles per package.

Secondary Package

The package system of the present invention comprises a secondary package accommodating at least one primary package.

A moisture barrier of the secondary package of the present invention slows moisture from being absorbed by a primary package and an article therein. Moisture barrier properties of a secondary package material is considered barrier properties of a secondary package made by the secondary package material. Moisture barrier of a secondary package material or a secondary package in the present invention can be measured via ASTM E96, i.e. the water vapor transmission rate, "WVTR" under stressed conditions specified under Water Vapor Transmission Rate described herein. This test can provide useful information regarding the moisture vapor transmission of a package material. Given there are several regions globally which have elevated temperatures and often times elevated relative humidity, the inventors have performed the ASTM E96 WVTR test at stressed conditions of 40° C. and 75% relative humidity.

The secondary package of the present invention comprises a second package material having a vapor transmission rate lower than about 100 g/m²/day, or lower than about 95 g/m²/day, or lower than about 90 g/m²/day, specifically reciting all values within these ranges and any ranges created thereby, as measured according to Water Vapor Transmission Rate Test described herein. The secondary package having a water vapor transmission rate lower than about 100 g/m²/day can effectively reduce moisture transfer via the secondary package, and reduce the likelihood of the wetness indicators being activated prematurely when the package system contains disposable absorbent articles.

Further the secondary package in the present invention helps stabilize the primary package and endure a weight of stacked packages during storage and transportation to the retailers and consumers. The secondary package in the present invention has a resistance to compression higher than about 150N, or higher than about 160N, or higher than about 170N, specifically reciting all values within these ranges and any ranges created thereby. When the secondary package has a resistance to compression lower than about 150N, it may get deformed and collapse when stacked during storage and transportation.

In addition, the secondary package of the present invention may have some level of mechanical strength in order to withstand the rigors of a packaging process, and provide protection from environmental insults during shipping and while on the store shelf, and provide for product protection while in the consumer's home. In one embodiment, the secondary package of the present invention has a puncture resistance higher than about 7 Joules, or higher than about 10 Joules, or higher than about 15 Joules, specifically reciting all values within these ranges and any ranges created thereby, as measured according to Puncture Resistance Test disclosed herein.

The secondary package of the present invention may comprise plastic film. The secondary package of the present invention may essentially consist of plastic film. The secondary package material may be recyclable in plastic film recycling operations such as one developed by Cadel Deinking, wherein flexible plastic packaging films are recycled including deinking to yield a recycled plastic with quality similar to new plastic (https://cadeldeinking.com/en/). Another option for recycling the secondary package material of the present invention may be in recycling operations such as PURECYCLE technology (https://purecycle.com/).

A plurality of secondary packages can stay wrapped until required to unpack by a seller of the products. Similarly, the secondary packages may stay sealed until the primary packages therein are needed. Each of the secondary packages may comprise package information providing instructions on how and/or when to open.

Where the package system of the present invention comprises an absorbent article, and the secondary package has sufficient barrier to moisture absorption, wetness indicators as well as SAP within the absorbent article will have a longer shelf life. In one embodiment, the primary package containing at least one article has a moisture pick-up less than 2%, or less than about 1.8%, or less than about 1.5%, or less than about 1.2% as measured according to Moisture Pick-up test.

The secondary package may have a basis weight of from about 80 gsm to about 220 gsm, or from about 90 gsm to about 210 gsm, or from about 120 gsm to 145 gsm, specifically reciting all values within these ranges and any ranges created thereby. The basis weight can be determined via ISO 536 as modified herein.

The secondary packages of the present invention may also comprise a plurality of seals. Seals are package material seams which have been attached to one another. Seams are areas of the package where at least two portions of the package material have the ability to overlap one another. Seals are created when the at least two portions of the package material in the seam are joined to one another. When the secondary packages comprises plastic film seals may be created via heat sealing the film layer to itself with or without the use of adhesive. The seals are important to ensure that the secondary packages of the present invention can prevent moisture transfer inside the secondary packages.

It is worth noting that conventional corrugate boxes, cardboard boxes, and film-coated corrugate/cardboard boxes prevalent in packaging as secondary packages have a high WVTR value and cannot provide desirable barrier properties. The secondary packages in the present invention is sealed such that a primary package inside is completely enclosed and protected from the external environment by the secondary package.

In one embodiment, the secondary package in the present invention comprises an air-inflated package material as exemplified in FIGS. 1A-1D, and FIGS. 6A-8E. The air-inflated package may comprise a plurality of air-inflated columns. Examples of air-inflated package materials are disclosed for example in U.S. Pat. No. 10,526,126B and US 2020/0140178A.

FIGS. 6A-6D show a secondary package of air-inflated film comprising a plurality of air inflated columns. FIGS. 7A-7D show another example of a secondary package of air-inflated film comprising a plurality of air inflated columns. The secondary package made by air-inflated film comprising a plurality of air inflated columns has a desirable physical strengths to withstand rigors of being shipped and transported. The secondary package made by air-inflated film comprising a plurality of air inflated columns may be transparent or translucent, so that artwork such as trademark and product information on the primary package is visible. A sticker where package information providing instructions on how and/or when to open may be disposed on the outer surface of the secondary package.

The secondary package of the present invention may be in a self-standing even without a primary package.

The secondary package of the present invention may maintain a stable, a substantially parallelepiped-shape, and may comprise a generally cuboid shape. So, in addition to a front panel corresponding to a consumer-facing panel in a primary package, the secondary package of the present invention may further comprise a back panel opposing the front panel, a left panel disposed between the front panel and the back panel, a right panel opposing the left panel, a bottom panel disposed between the front panel and the back panel, and an opposing top panel. Other package shapes are contemplated. Additional examples are contemplated where package shapes comprising less than six panels are formed. Building on these examples, primary packages having a circular or semi-circular shape when viewed from a bottom panel are contemplated. Additionally, primary packages having a triangular shape when viewed from the bottom panel are contemplated.

In one embodiment, the secondary package comprises an air-inflated column material and in a cuboid shape as exemplified in FIGS. 1A-1D, and FIGS. 6A-8E. The secondary package may have a plurality of air-inflated columns in a vertical direction when the secondary package is in a standing position. The secondary package may have a plurality of air-inflated columns in a direction from the top panel to the bottom panel of the secondary package. Such a structure of the secondary package having a plurality of air-inflated columns in a vertical direction when the secondary package is in a standing position or in a direction from the top panel to the bottom panel of the second package may enable the secondary package to have a desirable physical strength such as a resistance to compression higher than about 150N.

Figure 8A:
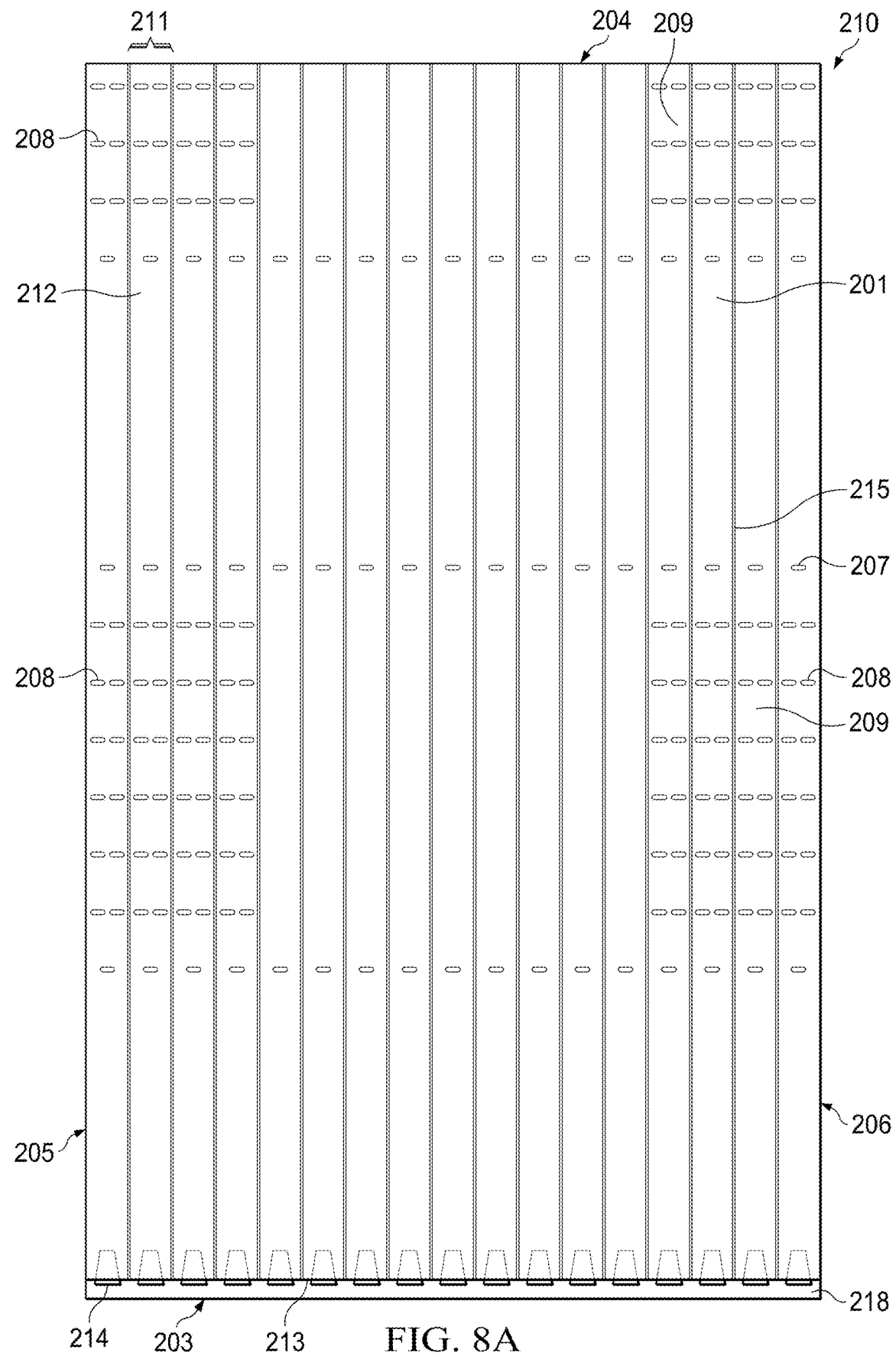
FIG. 8A shows a flat view of an air column film material.
Figure 8B:
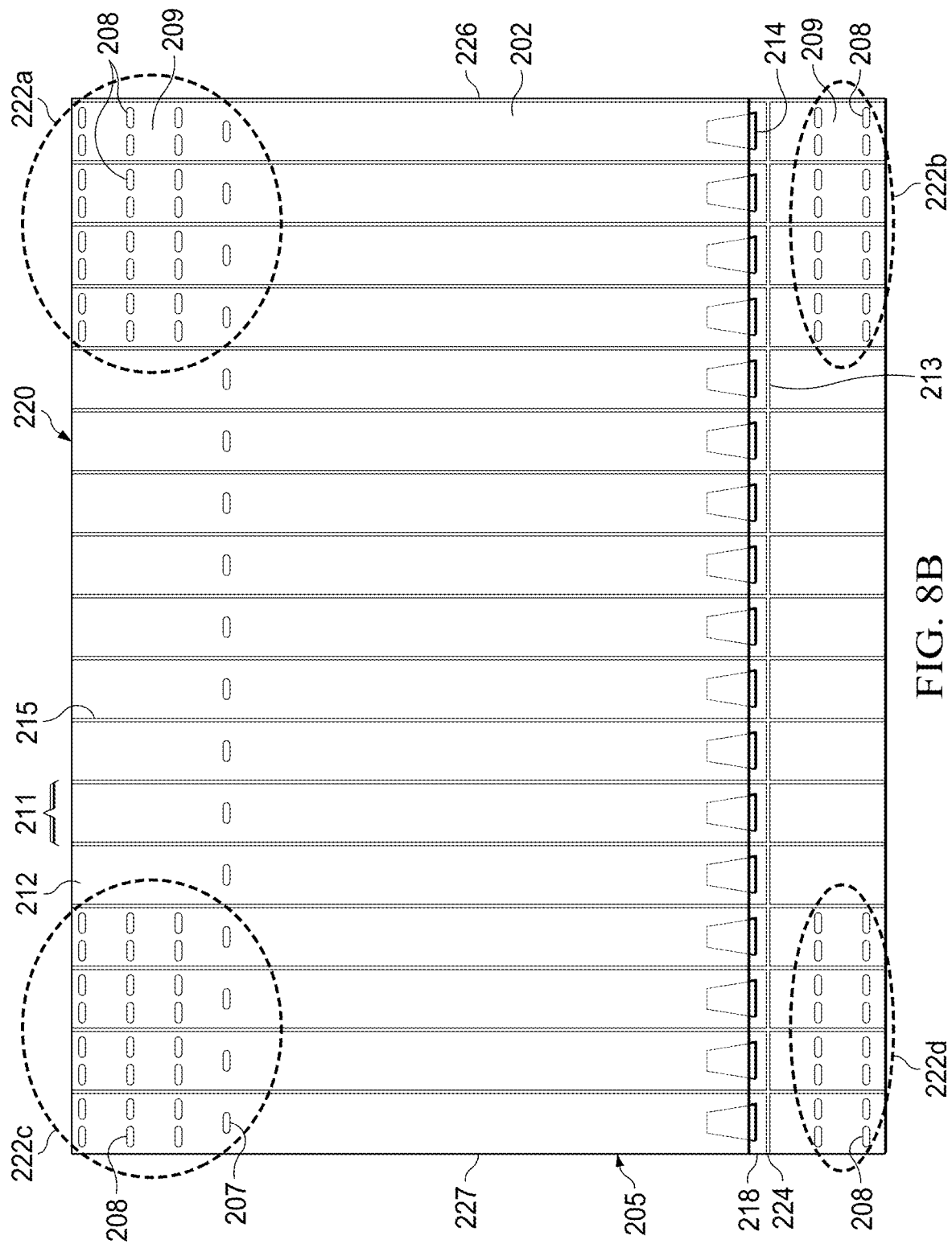
FIG. 8B shows a pouch-like structure made by the air column film material of FIG. 8A.

Referring to FIGS. 8A-8E, an exemplary air-inflated secondary package is explained. FIG. 8A shows an exemplary flat air-inflatable film 210 from which an air-inflated secondary package can be prepared. The air-inflatable film 210 comprises a plurality of air columns 211. Referring to FIGS. 8A and 8B, each air column 211 comprises a first film layer 201 and a second film layer 202. The first film layer 201 and the second film layer 202 overlap with each other, and form a tubular chamber 212 and a chamber open 213 in each air column 211, wherein the tubular chamber 212 communicates with the chamber open 213. Two adjacent air columns 211 are divided by a heat-sealed dividing seam 215. Each one way valve 214 is provided at each chamber open 213, so that each tubular chamber 212 can be inflated with air (or gas) via each chamber open 213. When the inflating process is finished, the pressure in each tubular chamber 212 reaches to a predetermined value and each one way valve 214 can be sealed automatically, so as to prevent gas leakage from each tubular chamber 212. The flat air-inflatable film 210 comprises areas 209 of high density of dot seals 208.

The first film layer 201 and the second film layer 202 may be selectively sealed to form one or more bending seams 207. Two side ends of each bending seam 207 are not extended to dividing seams 215 forming tubular chamber 212, so that the bending seam 207 does not block the air flow and air can flow along tubular chamber 212. Bending seams 207 may be formed to be arranged to form a line in order to form the air-inflated package. The air-inflatable film 210 may have more than one line of bending seams 207. After each air column 211 is filled with air or gas, each air column 211 can be bended at the position of bending seam 207, so as to form a plurality of side walls. Referring to FIGS. 8B and 8C, a pouch-like structure 220 is formed by folding the flat air inflatable film 210 in FIG. 8A in such a way that the first side 203 and the opposite second side 204 of the flat air-inflatable film 210 are joined together via heat sealing to form a seal 224, and an overlapped third side 205 of the flat air-inflatable film 210 is heat sealed to form a closed end 226. Referring to FIG. 8C, the pouch-like structure 220 when erected has a bottom wall, four side walls and an open end, so as to form a containing cavity automatically. The fourth side 206 of the flat air-inflatable film 210 forms an open end 227 in the pouch-like structure 220. 222a, 222b, 222c and 222d are non-inflatable portions corresponding to the areas 209 of high density of dot seals 208 in the flat air-inflatable film 210.

Figure 8D:
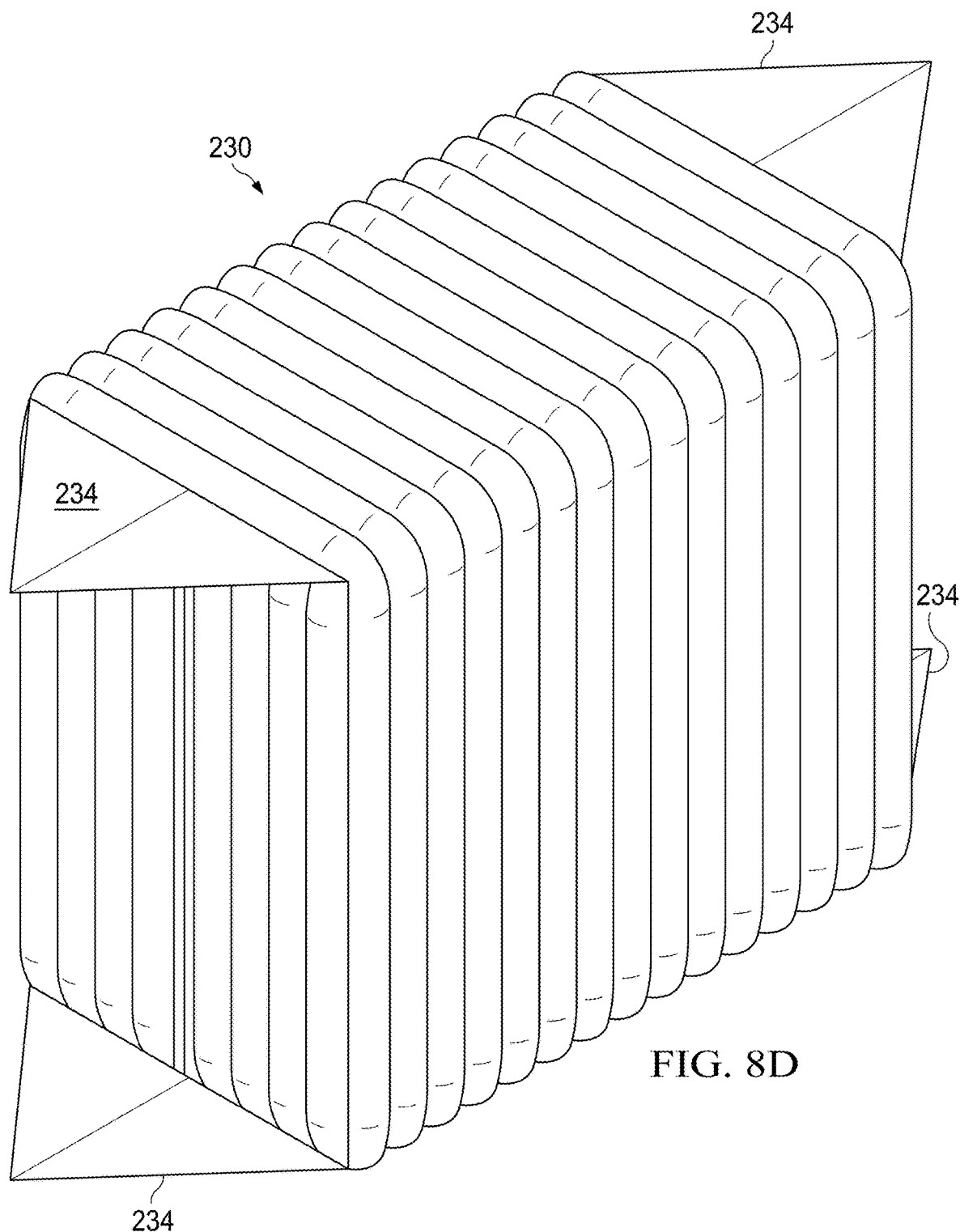
FIG. 8D shows an inflated and sealed air column package made by the air-inflated package with an open end in FIG. 8C.
Figure 8E:
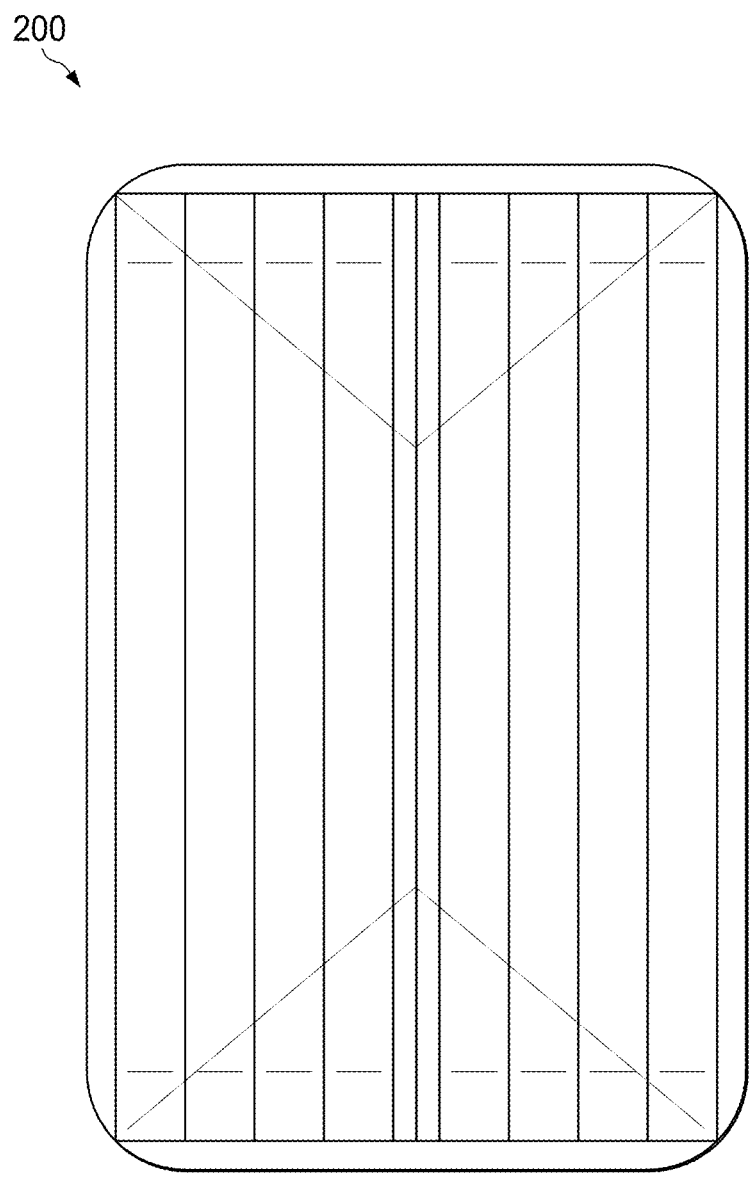
FIG. 8E shows a side view of a secondary package made by the inflated and sealed air column package in FIG. 8D.

One or more primary packages containing at least one articles are inserted into the pouch-like structure 220 via the open end 227, and the open end 227 is heal sealed to form an air-tight package 230. Referring to FIG. 8D, after insertion of the primary package and heat-sealing of the open end 227, air columns 211 are inflated with gas via an inflation port to form an air-inflated structure 230. The area 209 of high density of dot seals 208 in the inflatable film 210 form non-inflated structures 234, triangular corners, at corresponding positions. Referring to FIG. 8E, the four triangular corners are tucked in to form a cuboidal air-inflated package 200. The primary package is not indicated in FIGS. 8C-8E for simplicity purposes.

Conventional corrugate-based boxes do not have desirable mechanical properties such as a high puncture resistance. Further, these boxes have a higher basis weight than the package materials of the present invention to provide requested mechanical strength such as resistance to compression.

Despite having lower basis weight than cardboard and cartonboard, the secondary package of the present invention can withstand the rigors of a manufacturing process where a primary package is placed within the package as well as the rigors of being shipped, provide protection from environmental insults during shipping, and provide for product protection while in the consumer's place.

Articles

The primary package in the present invention accommodates at least one article. There is no critical limitation on the article as along as the article can be packaged and transported using the packages disclosed herein. The article may be a disposable absorbent articles.

Absorbent Article

In some embodiments, the articles are absorbent articles such as are diapers and/or training pants comprising an absorbent material such as super absorbent polymer ("SAP"). Absorbent articles which have high amounts of SAP, typically absorbent gelling material, may also present problems with humid environments. As an example, the SAP in these absorbent articles may change color after absorbing an amount of moisture, in the form of water vapor, from the environment. Unfortunately, this color change can cause concern amongst wearer or caregivers alike.

Additionally, the inventors have surprisingly found that while SAP is effective at absorbing moisture from its environment in the form of water vapor, its absorption of water vapor does not continue until the capacity of the SAP is depleted. Instead, the SAP will absorb water vapor for a period of time, e.g. weeks under stress conditions (described hereafter), and approaches steady state. Steady state for the amount of water vapor absorbed by SAP is much lower than the overall capacity of the SAP. So, the SAP within the absorbent article still has capacity to absorb liquid insults during use. As an example, steady state can be less than about 10 percent of the total capacity of the absorbent article. However, even at under 10 percent, enough water vapor may be absorbed to activate wetness indicators prior to wear and/or cause a color change in the SAP.

A myriad of factors can impact the absorption of moisture by SAP in an absorbent article. As an example, while not wishing to be bound by theory, the cellulose within absorbent articles is not as susceptible to absorption of moisture of water vapor as is SAP. It is theorized that cellulose material within the absorbent article does not absorb as much water vapor from the environment as does SAP. As such, it is theorized that absorbent articles having a high ratio of cellulose to SAP by weight may not absorb as much moisture vapor from the environment as those absorbent articles with a lower ratio of cellulose to SAP by weight. Similarly, it is theorized that absorbent articles with a high weight or grams of SAP per absorbent article may also absorb more water vapor that absorbent articles with very low weight or grams of SAP.

In another embodiment, the absorbent articles are menstrual pads typically which have much less SAP per article than do diapers or training pants. And similarly, menstrual pads typically have much less SAP per article than do adult incontinence pads and/or pants. It is theorized that absorbent articles comprising SAP in an amount of greater than 5 grams per article, or 8 grams per article, or 10 grams per article would potentially benefit from the packages of the present invention.

Additionally, it is theorized that the amount of breathability of the backsheet of the absorbent article may similarly contribute to or influence the amount of water vapor absorbed by SAP while in an absorbent article package. As an example, a non-breathable film may provide a high barrier to moisture absorption by SAP, while the SAP containing articles are in a package. However, for diapers, pants, and adult incontinence pants with breathable films as a backsheet component, such breathable films are theorized to allow humidity to traverse the space between or diffuse between adjacent absorbent articles within a package. Net, it is believed that absorbent article packaging materials of the present invention are particularly needed for absorbent articles comprising breathable films as a backsheet component.

Figure 4:
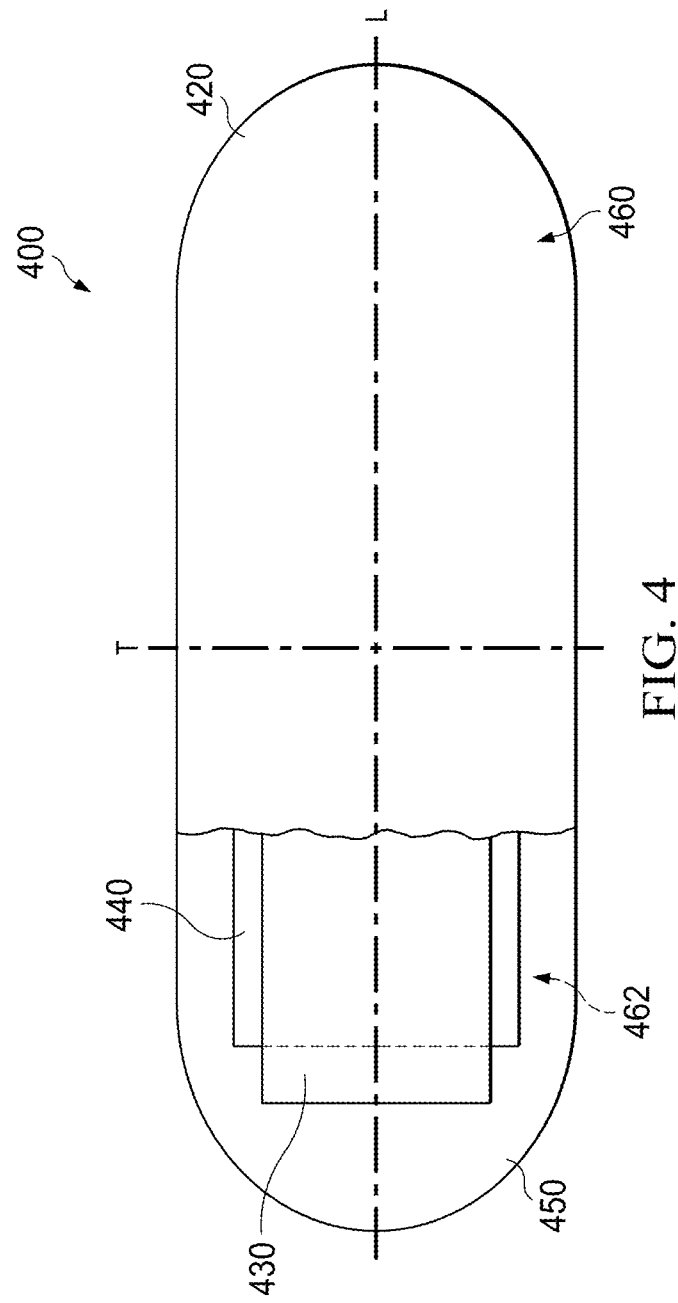
FIG. 4 is a schematic representation of an absorbent article of the present invention in the form of a sanitary napkin showing a partial-cutaway-view of the article.
Figure 5:
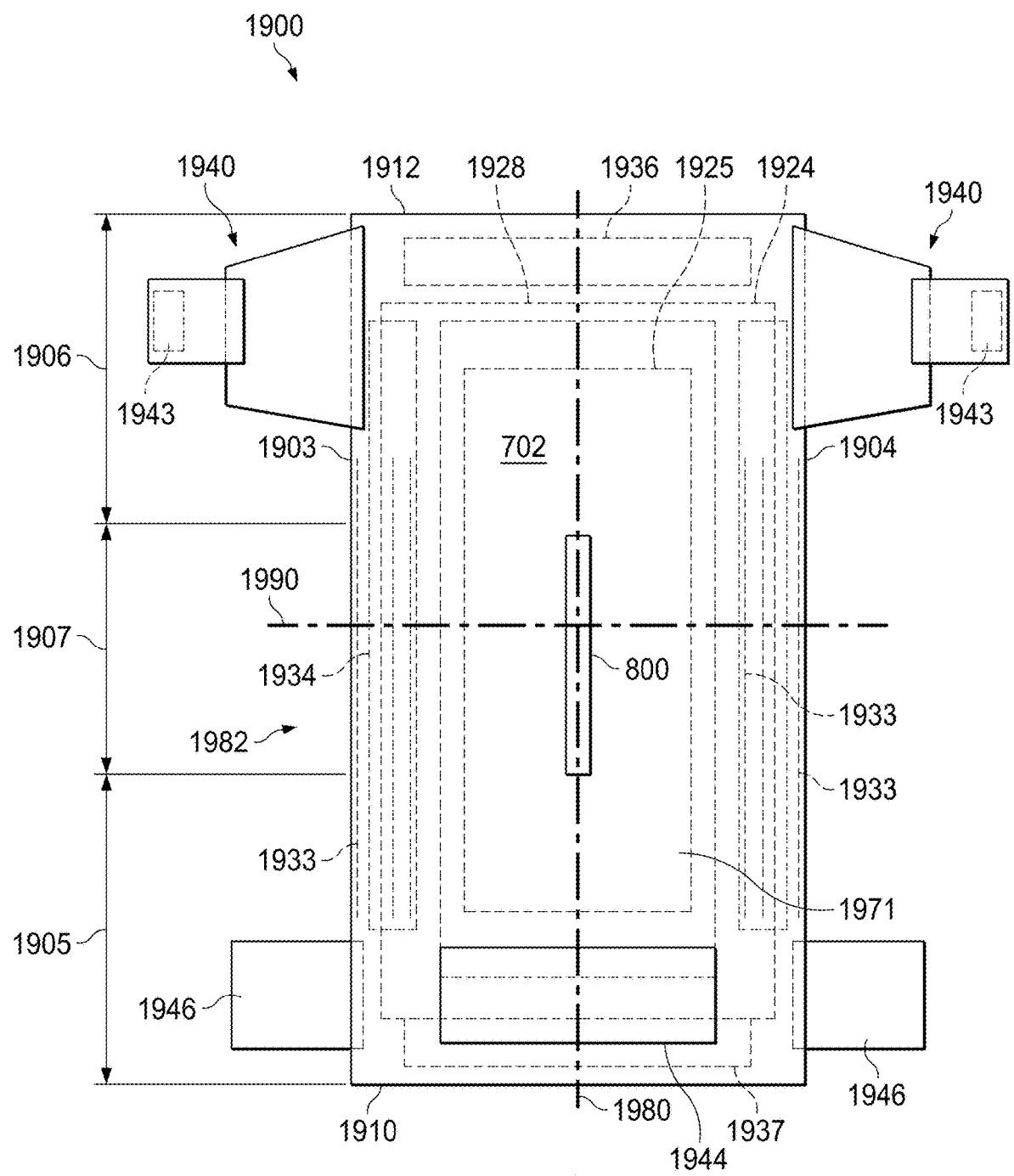
FIG. 5 shows a plan view of an example absorbent article in the form of a taped diaper, garment-facing surface facing the viewer, in a flat laid-out state.
Figure 6A:
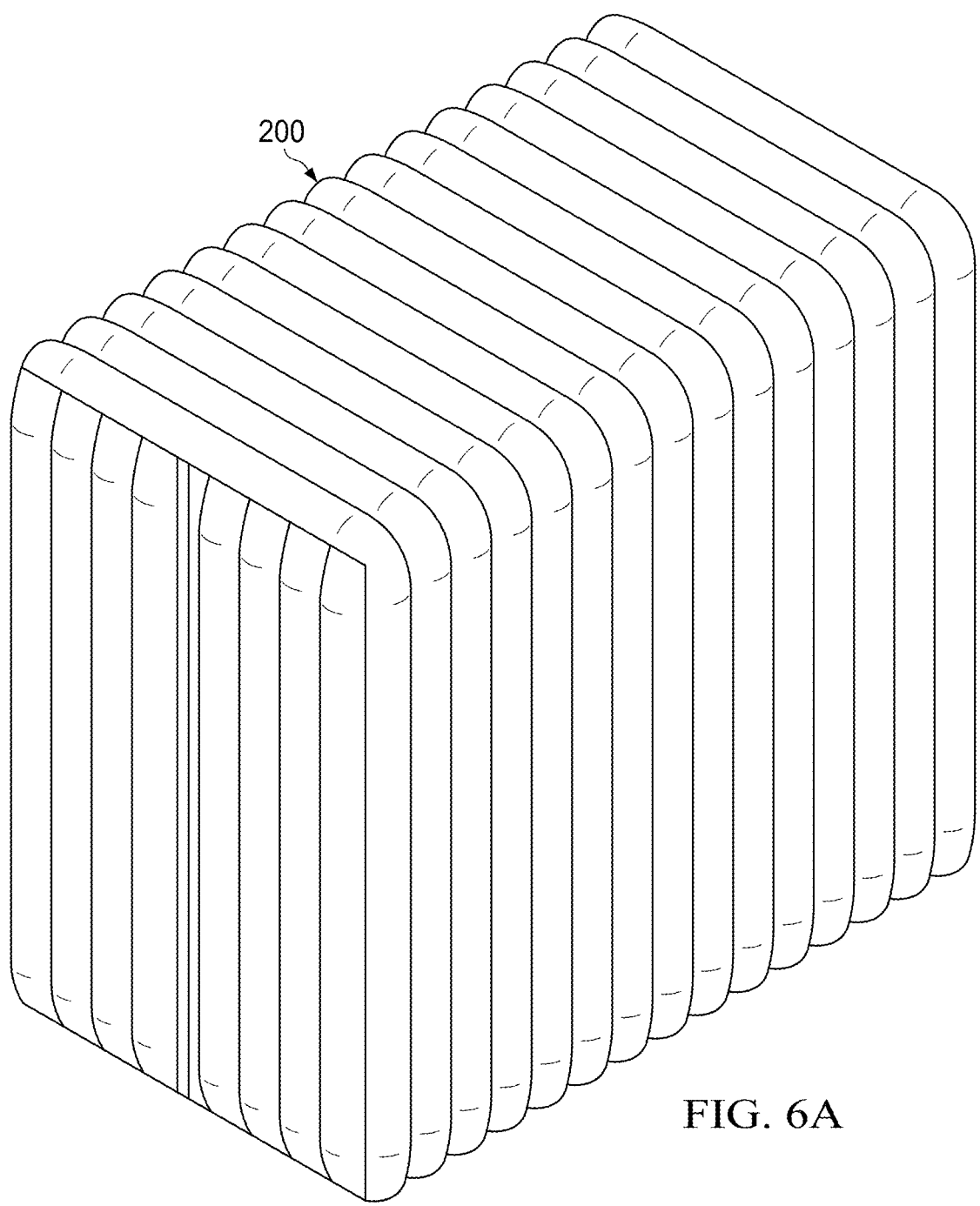
FIG. 6A shows a perspective view of an exemplary secondary package.
Figure 6B:
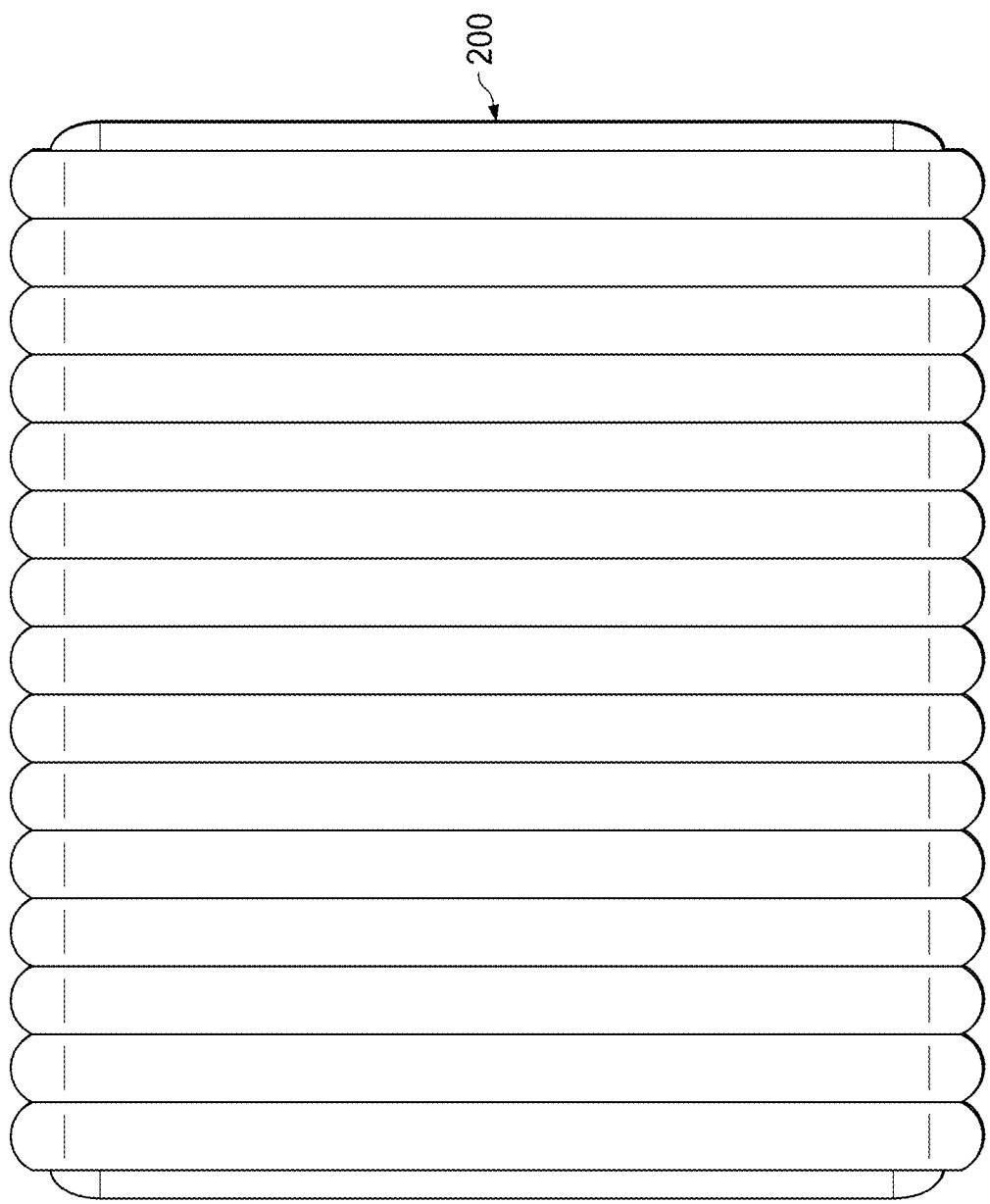
FIG. 6B shows a front view of the package of FIG. 6A.
Figure 6C:
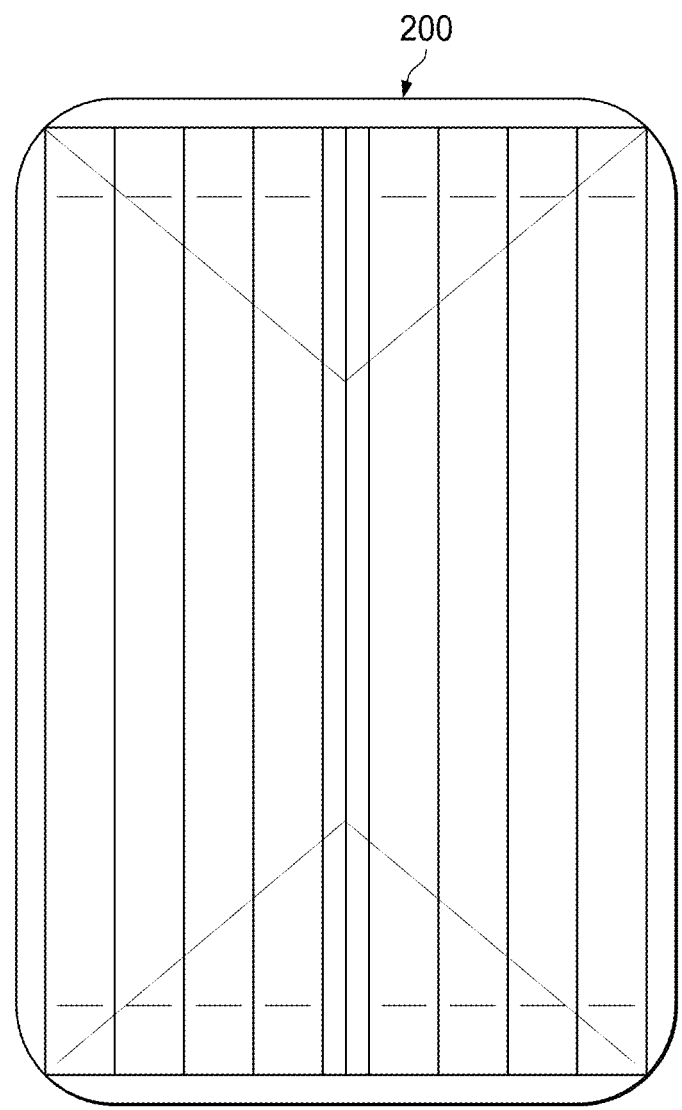
FIG. 6C shows a side view of the package of FIG. 6A.
Figure 6D:
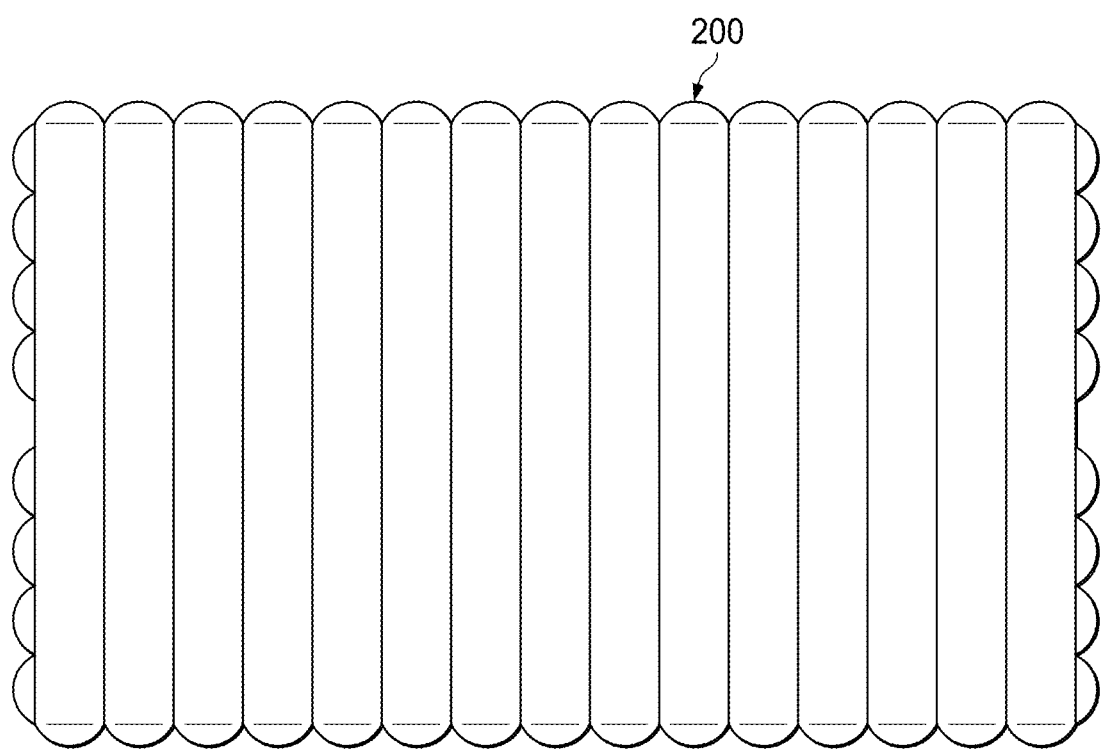
FIG. 6D shows a top view of the package of FIG. 6A.
Figure 7A:
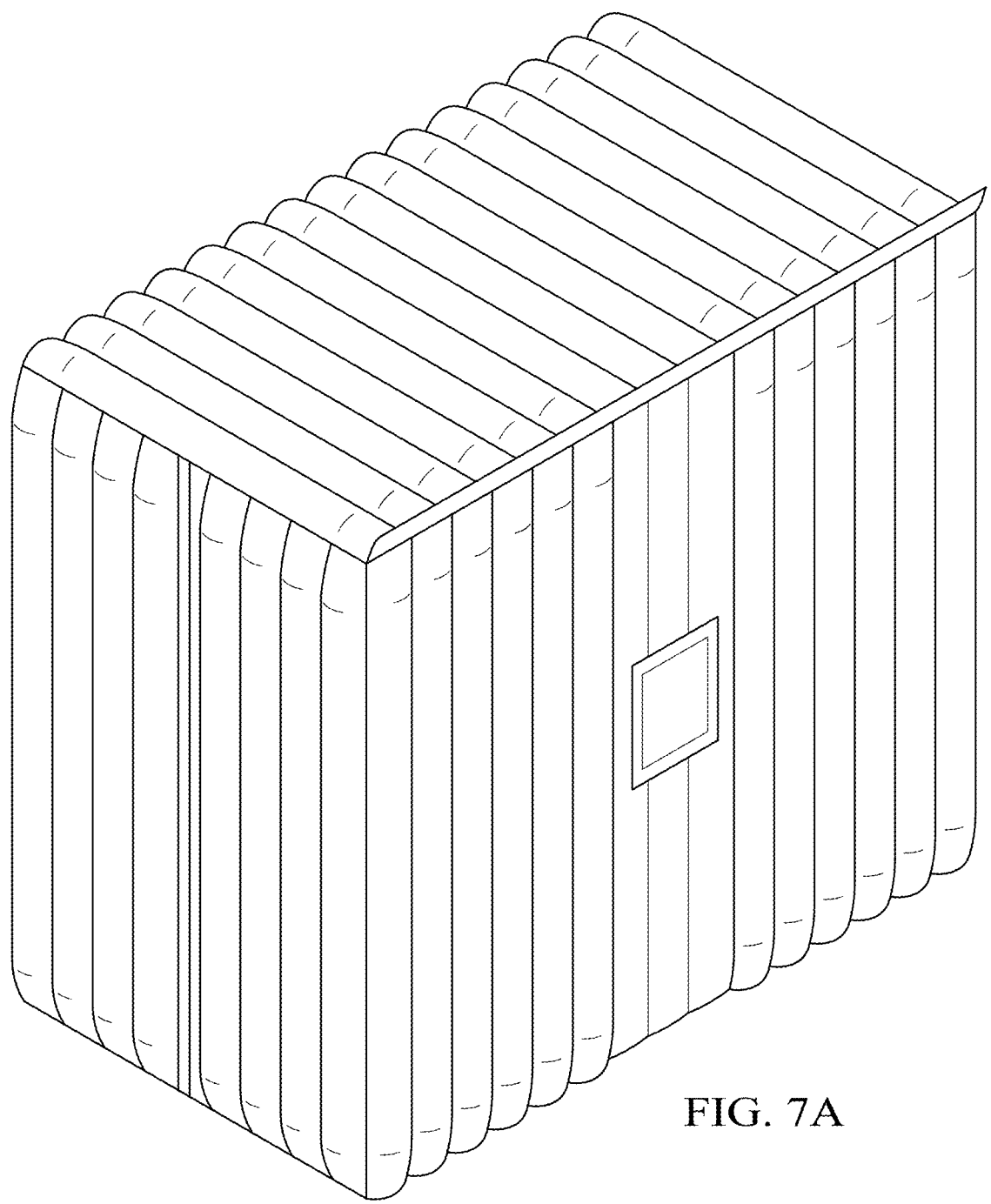
FIG. 7A shows a perspective view of another exemplary secondary package.
Figure 7B:
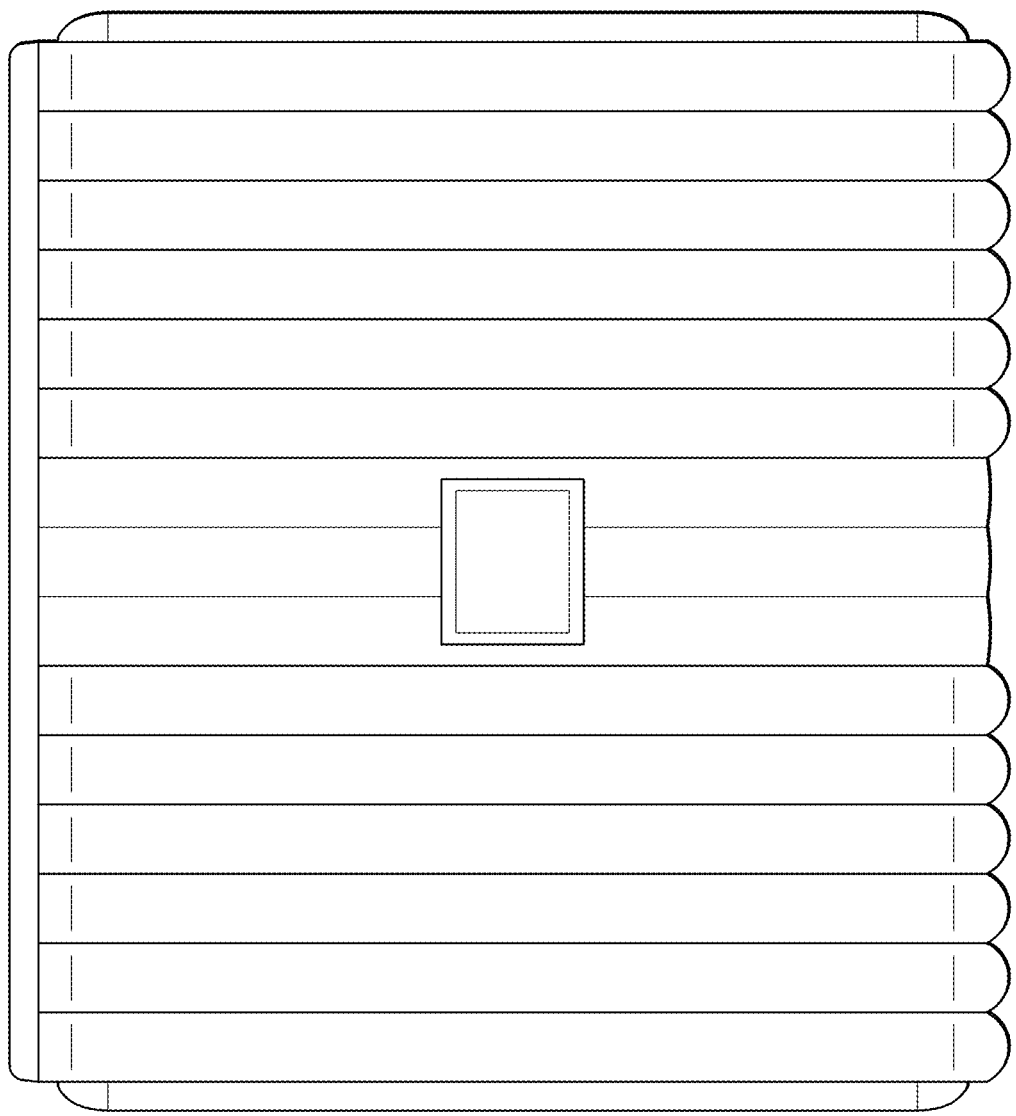
FIG. 7B shows a front view of the package of FIG. 7A.
Figure 7C:
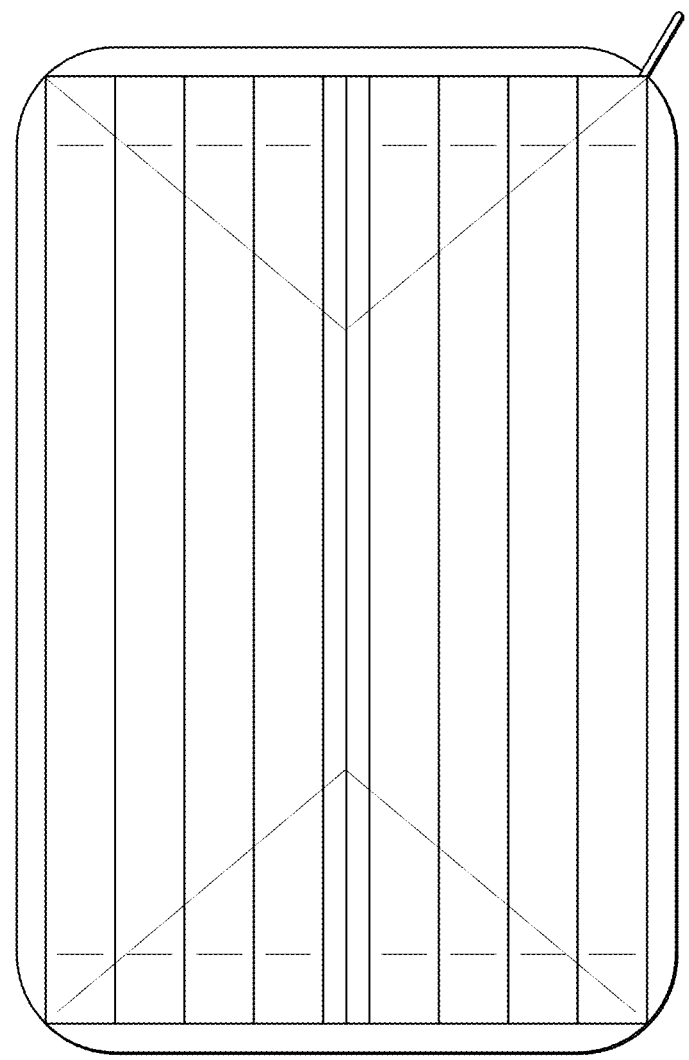
FIG. 7C shows a top view of the package of FIG. 7A.
Figure 7D:
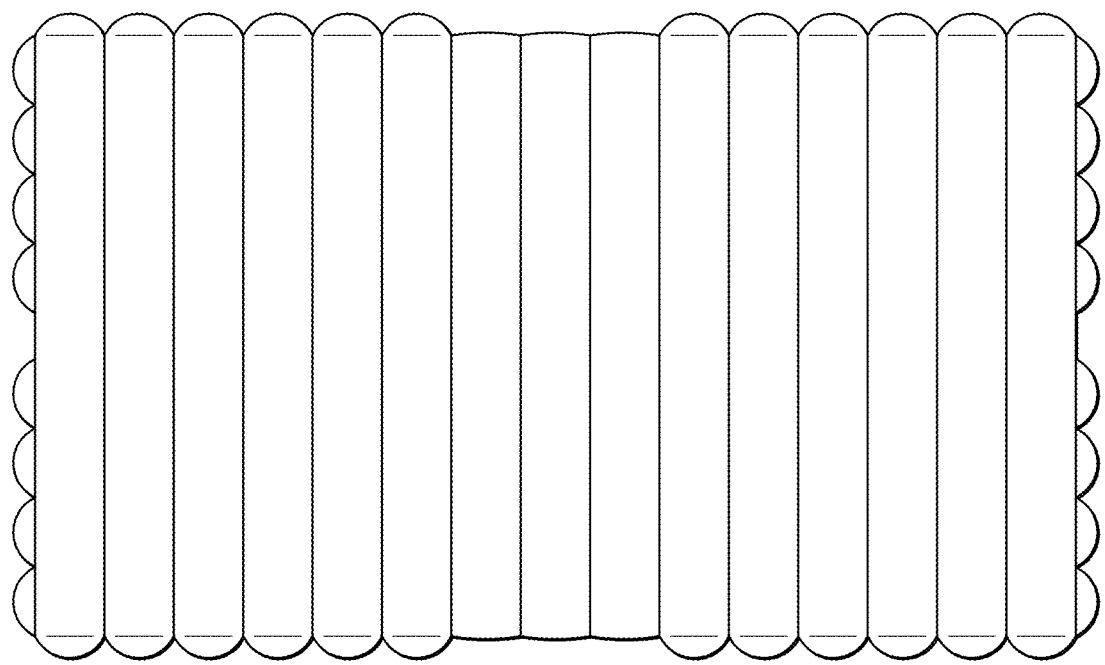
FIG. 7D shows a top view of the package of FIG. 7A.

As noted previously, the absorbent articles which can be packaged within the package material of the present invention are numerous. Two specific examples are provided in FIGS. 4 and 5. However, the package material and packages of the present invention may be utilized to contain a multitude of absorbent articles as described previously. FIGS. 4 and 5 are merely examples of articles which may be contained with the package material/packages of the present invention.

In FIG. 4 an exemplary feminine hygiene pad 400 is shown. The feminine hygiene pad 400 comprises a topsheet 420, a backsheet 450, and an absorbent core 440 disposed between the topsheet 420 and the backsheet 450. A fluid management layer 430 may be disposed between the topsheet 420 and the absorbent core 440. The absorbent article has a wearer-facing surface 460 and an opposing garment-facing surface 462. The wearer-facing surface 460 primarily comprises the topsheet 420 while the garment-facing surface 462 primarily comprises the backsheet 450. Additional components may be included in either the wearer-facing surface 460 and/or the garment-facing surface 462. For example, where the absorbent article is an incontinence pad, a pair of barrier cuffs which extend generally parallel to a longitudinal axis L of the absorbent article 400, may also form a portion of the wearer-facing surface 460. Similarly, a fastening adhesive may be present on the backsheet 450 and form a portion of the garment-facing surface 462 of the absorbent article.

The absorbent core 440 may comprise any suitable shape including but not limited to an oval, a discorectangle, a rectangle, an asymmetric shape, and an hourglass. For example, in some forms of the present invention, the absorbent core 440 may comprise a contoured shape, e.g. narrower in the intermediate region than in the end regions. As yet another example, the absorbent core may comprise a tapered shape having a wider portion in one end region of the pad which tapers to a narrower end region in the other end region of the pad. The absorbent core may comprise varying stiffness in the MD and CD.

The configuration and construction of the absorbent core may vary (e.g., the absorbent core 440 may have varying caliper zones, a hydrophilic gradient, a superabsorbent gradient, or lower average density and lower average basis weight acquisition zones). Further, the size and absorbent capacity of the absorbent core 440 may also be varied to accommodate a variety of wearers. However, the total absorbent capacity of the absorbent core 440 should be compatible with the design loading and the intended use of the disposable absorbent article or incontinence pad.

In some forms of the present invention, the absorbent core may comprise a plurality of multi-functional layers that are in addition to the first and second laminates. For example, the absorbent core may comprise a core wrap (not shown) useful for enveloping the first and second laminates and other optional layers. The core wrap may be formed by two nonwoven materials, substrates, laminates, films, or other materials. In a form, the core wrap may only comprise a single material, substrate, laminate, or other material wrapped at least partially around itself. The absorbent core may comprise one or more adhesives, for example, to help immobilize the SAP or other absorbent materials within the first and second laminates.

Absorbent cores comprising relatively high amounts of SAP with various core designs are disclosed in U.S. Pat. No. 5,599,335 to Goldman et al., EP 1,447,066 to Busam et al., WO 95/11652 to Tanzer et al., U.S. Pat. Publ. No. 2008/0312622A1 to Hundorf et al., and WO 2012/052172 to Van Malderen. These may be used to configure the superabsorbent layers.

Another example of an absorbent article which can be included in the packages of the present invention are diapers. As shown in FIG. 5, a plan view of an example absorbent article that are a diaper 1900 in its flat-out, uncontracted state (i.e., with elastic induced contraction pulled out) with its wear's skin-facing surface toward the viewer, and its garment-facing surface toward the viewer, respectively.

This diaper is shown for illustration purpose only as the packages of the present invention may be used for a wide variety of diapers and other absorbent articles.

The absorbent article may comprise a liquid permeable topsheet 1924, a liquid impermeable backsheet 1925, an absorbent core 1928 positioned at least partially intermediate the topsheet 1924 and the backsheet 1925, and barrier leg cuffs 1934. Each barrier leg cuff 1934 may comprise one or more elastic strings or elastic elements 1933 in the chassis of the absorbent article between the topsheet 1924 and backsheet 1925 in the area of the leg openings.

The absorbent article may also comprise a liquid management system ("LMS") between the topsheet 1924 and the absorbent core 1928 which, in the example represented, comprises a distribution layer and an acquisition layer. The LMS may also be provided as a single layer or two or more layers. FIG. 5 also shows typical taped diaper components such as a fastening system comprising adhesive tabs 1942 or other mechanical fasteners attached towards the rear edge of the absorbent article 1900 and cooperating with a landing zone 1944 on the front of the absorbent article 1900. The absorbent article may also comprise other typical elements, which are not represented, such as a rear elastic waist feature and a front elastic waist feature (1937 shown in FIG. 5), for example.

The absorbent article 1900 may comprise a front waist edge 1910, a rear waist edge 1912 longitudinally opposing the front waist edge 1910, a first side edge 1903, and a second side edge 1904 laterally opposing the first side edge 1903. The front waist edge 1910 is the edge of the absorbent article 1900 which is intended to be placed towards the front of the user when worn, and the rear waist edge 1912 is the opposite edge. Together the front waist edge 1910 and the rear waist edge form waist opening when the absorbent article 1900 is donned on a wearer. The absorbent article 1900 may have a longitudinal axis 1980 extending from the lateral midpoint of the front waist edge 1910 to a lateral midpoint of the rear waist edge 1912 of the absorbent article 1900 and dividing the absorbent article 1900 in two substantially symmetrical halves relative to the longitudinal axis 1980, with article placed flat and viewed from the wearer-facing surface as illustrated in FIGS. 5 and 6. The absorbent article may also have a lateral axis 1990 extending from the longitudinal midpoint of the first side edge 1903 to the longitudinal midpoint of the second side edge 1904. The length L of the absorbent article 1900 may be measured along the longitudinal axis 1980 from the front waist edge 1910 to the rear waist edge 1912. The crotch width of the absorbent article 1900 may be measured along the lateral axis 1990 from the first side edge 1903 to the second side edge 1904. The absorbent article 1900 may comprise a front waist region 1905, a rear waist region 1906, and a crotch region 1907.

The topsheet 1924, the backsheet 1925, the absorbent core 1928, and the other article components may be assembled in a variety of configurations, in particular by gluing or heat embossing, for example.

The absorbent core 1928 may comprise an absorbent material comprising 75% to 100%, at least 80%, at least 85%, at least 90%, at least 95%, or at least 99%, all by weight, of the absorbent material, specifically reciting all 0.1% increments within the above-specified ranges and all ranges formed therein or thereby, and a core wrap enclosing the absorbent material.

The absorbent core 1928 may comprises one or more channels. Additionally or alternative, the LMS may comprises one or more channels. In some forms, the channels of the LMS may be positioned within the absorbent article 1900 such they aligned with, substantially aligned with, overlap, or at least partially overlap, the channels of the absorbent core 1928. These and other components of the absorbent articles will now be discussed in more details.

The topsheet 1924 is the part of the absorbent article that is directly in contact with the wearer's skin. The topsheet 1924 may be joined to the backsheet 1925, the core 1928 and/or any other layers as is known to those of skill in the art. Usually, the topsheet 1924 and the backsheet 1925 are joined directly to each other in some locations (e.g., on or close to the periphery of the article) and are indirectly joined together in other locations by directly joining them to one or more other elements of the absorbent article 1900.

The backsheet 1925 is generally that portion of the absorbent article 1900 positioned adjacent the garment-facing surface of the absorbent core 1928 and which prevents, or at least inhibits, the bodily exudates absorbed and contained therein from soiling articles such as bedsheets and undergarments. The backsheet 1925 is typically impermeable, or at least substantially impermeable, to liquids (e.g., urine, running BM), but permeable to vapors to allow the diaper to "breath". In one specific example, the backsheet may comprise a film and a nonwoven, wherein the nonwoven (1971 shown in FIG. 5) forms a portion of a garment-facing surface of the article.

As used herein, the term "absorbent core" refers to the individual component of the absorbent article having the most absorbent capacity and that comprises an absorbent material. The absorbent core may comprise a core wrap or core bag (hereafter "core wrap") enclosing the absorbent material. The term "absorbent core" does not include the LMS or any other component of the absorbent article which is not either integral part of the core wrap or placed within the core wrap. The absorbent core 1928 of the present invention may comprise a high amount of superabsorbent polymers (herein abbreviated as "SAP") enclosed within a core wrap. The SAP content may represent 70% to 100% or at least 70%, 75%, 80%, 85%, 90%, 95%, 99%, or 100% by weight of the absorbent material contained in the core wrap.

"Absorbent material" means a material which has some absorbency property or liquid retaining properties, such as SAP, cellulosic fibers as well as synthetic fibers.

In a form, the absorbent article may comprise front ears 1946 and rear ears 1940. The ears may be an integral part of the chassis, such as formed from the topsheet 1924 and/or backsheet 1925 as side panel. The rear ears 1940 may be stretchable to facilitate the attachment of the tabs 1942 (fasteners 1943) to the landing zone 1944 and maintain the taped diapers in place around the wearer's waist. The rear ears 1940 may also be elastic or extensible to provide a more comfortable and contouring fit by initially conformably fitting the absorbent article to the wearer and sustaining this fit throughout the time of wear well past when absorbent article has been loaded with exudates since the elasticized ears allow the sides of the absorbent article to expand and contract.

In some embodiments, the articles are absorbent articles such as are diapers and/or training pants having a moisture sensitive indicator or wetness indicator 800 referring FIG. 5. These wetness indicators may be triggered in their packages prior to use depending on the environmental conditions in which the package of articles is situated. An inactivated wetness indicator is one in which the wetness indicator is substantially available to receive and indicate the level of liquid within the article. For example, in the case of color changing or appearing wetness indicators, a substantially inactivated wetness indicator is one in which 70 percent or more, or 85 percent or more, or 95 percent or more, of the area of the wetness indicator (i) is the original (dry) color or (ii) has not appeared, specifically reciting all values within this range and any range created thereby. As another example, regarding disappearing graphics, a substantially inactivated wetness indicator is one in which the disappearing graphic is present at about 70 percent or more, or 85 percent or more, or 95 percent or more, specifically reciting all values within this range an any range created thereby.

The wetness indicators of the present invention may be according to any wetness indicating system known in the art. It is known that wetness indicator can provide an appearing signal, a disappearing signal or a color change signal, and of course combinations thereof. An appearing signal will typically not be visible or more generally perceivable in the dry article, and becomes visible or otherwise perceivable when the article is wet. An appearing signal may for example be provided by a composition which is transparent or having a color that matches the color of the backsheet material, which is typically white, in its dry state, and then changes to a different color when contacted with urine. Other appearing wetness indicator may also be elements capable of providing a physical sensation indicating a fullness level of the absorbent assembly. Examples of such elements are disclosed in WO2008132630 and include a temperature change element (cooling or heating element), a pressure-inducing element or a foam-producing element.

A wetness indicator composition may be applied on any layer of the absorbent article using a conventional technique, for example printing, spraying or coating, during the making of the absorbent article. The layer may advantageously be the inner surface of the backsheet or the outer surface of the bottom side of the core wrap. This allows the wetness indicator to be visible from the exterior of the article by transparency through the backsheet while keeping the wetness indicator composition within the article. The wetness indicator may in particular be easily applied on a layer such a nonwoven or film by a slot-coating process especially if the composition is applied as a hot-melt. The slot-coating process allows applying a well-defined slot or a series of slots extending in the machine direction of the converting line, which is typically parallel to the longitudinal direction of the article.

Test Methods

1. Caliper Test

The caliper, or caliper, of a single-layer test sample is measured under a static load by a micrometer, in accordance with compendial method ISO 534, with modifications noted herein. All measurements are performed in a laboratory maintained at 23° C.±2 C° and 50%±2% relative humidity and test samples are conditioned in this environment for at least 2 hours prior to testing.

Caliper is measured with a micrometer equipped with a pressure foot capable of exerting a steady pressure of 70 kPa±0.05 kPa onto the test sample. The micrometer is a dead-weight type instrument with readings accurate to 0.1 micron. A suitable instrument is the TMI Digital Micrometer Model 49-56, available from Testing Machines Inc., New Castle, DE, or equivalent. The pressure foot is a flat ground circular movable face with a diameter that is smaller than the test specimen and capable of exerting the required pressure. A suitable pressure foot has a diameter of 16.0 mm. The test sample is supported by a horizontal flat reference platform that is larger than and parallel to the surface of the pressure foot. The system is calibrated and operated per the manufacturer's instructions.

Measurements are made on single-layer test samples taken from rolls or sheets of the raw material, or test samples obtained from a finished package. When excising the test sample from a finished package, use care to not impart any contamination or distortion to the sample during the process. The excised sample should be free from residual adhesive and taken from an area of the package that is free from any seams or folds. The test sample is ideally 200 mm$^2$ and must be larger than the pressure foot.

To measure caliper, first zero the micrometer against the horizontal flat reference platform. Place the test sample on the platform with the test location centered below the pressure foot. Gently lower the pressure foot with a descent rate of 3.0 mm per second until the full pressure is exerted onto the test sample. Wait 5 seconds and then record the caliper of the test sample to the nearest 0.1 micron. In like fashion, repeat for a total of ten replicate test samples. Calculate the arithmetic mean for all caliper measurements and report the value as Caliper to the nearest 0.1 micron.

2. MD Tensile Strength Test

MD tensile strength of a material relates to processability of a package material on a package making process and/or packaging process.

The MD tensile strength of a film material is measured in accordance with ISO 527 under the following test conditions: A test speed is 500 mm/min, and a grips distance is 50 mm.

The MD tensile strength of a paper material is measured in accordance with ISO 1924-2 under the following test conditions: A test speed is 20 mm/min, and a grips distance is 180 mm.

When the MD tensile strength of a material is tested in a package, a tensile strength in the direction from a top panel to a bottom panel of primary package is considered MD tensile strength of the material.

3. Basis Weight Test

The basis weight of a test sample is the mass (in grams) per unit area (in square meters) of a single layer of material and is measured in accordance with compendial method ISO 536. The mass of the test sample is cut to a known area, and the mass of the sample is determined using an analytical balance accurate to 0.0001 grams. All measurements are performed in a laboratory maintained at 23° C.±2 C° and 50%±2% relative humidity and test samples are conditioned in this environment for at least 2 hours prior to testing.

Measurements are made on test samples taken from rolls or sheets of the raw material, or test samples obtained from a finished package. When excising the test sample from a finished package, use care to not impart any contamination or distortion to the sample during the process. The excised sample should be free from residual adhesive and taken from an area of the package that is free from any seams or folds. The test sample must be as large as possible so that any inherent material variability is accounted for.

Measure the dimensions of the single layer test sample using a calibrated steel metal ruler traceable to NIST, or equivalent. Calculate the Area of the test sample and record to the nearest 0.0001 square meter. Use an analytical balance to obtain the Mass of the test sample and record to the nearest 0.0001 gram. Calculate Basis Weight by dividing Mass (in grams) by Area (in square meters) and record to the nearest 0.01 grams per square meter (gsm). In like fashion, repeat for a total of ten replicate test samples. Calculate the arithmetic mean for Basis Weight and report to the nearest 0.01 grams/square meter.

4. Water Vapor Transmission Rate Test

Water Vapor Transmission Rate ("WVTR") test measures barrier properties of the package material, and is conducted according to ASTM E96 under the following test conditions: The temperature is 40° C. (±1° C.) and the relative humidity is 75% (±2%). WVTR test for an air column package is conducted with two layers of overlapping films constituting the air column package.

5. Caliper Test

The caliper of a film material is measured in accordance with ISO 4593.

6. Resistance to Compression Test

The resistance to compression of a second package indicates stacking ability on pallet. This test is conducted according to ISO 12048.

7. Puncture Resistance Test

Puncture resistance measures a capability of package resisting to a physical damage in storage and transportation. This test is conducted according to ISO 3036.

8. Moisture Pick-Up Test

Obtain a primary package containing at least one article. Weigh the primary package to the nearest 0.1 g using a digital balance, and record the weight. Obtain a secondary package. Put at least one primary package into the secondary package, and seal the secondary package properly. A corrugated box and a film-coated corrugated box are sealed by taping. A film package is heat-sealed in order not to have an open gap. Place the sealed secondary package in a constant temperature/constant humidity room ("CTCH") conditioned at 50° C. and 80% relative humidity. Retrieve each secondary package from the CTCH room after 72 hours. Open the secondary package and take a primary package out. Weigh the primary package to the nearest 0.1 g using a digital balance, and record the weight. Calculate weight gain as percentage for the primary package compared to its initial weight and record the weight gain to the nearest 0.1%.

Example I: Package Properties

Properties of several primary package materials were measured according to test methods under Test Methods herein, and indicated below in Table 1.

TABLE 1

|  | Sample 1-1 PE film* bag | Sample 1-2 PVA film* bag | Sample 1-3 paper* bag |
| --- | --- | --- | --- |
| MD Tensile strength (N/mm) | 1.47 | 2.9* | 6 |
| Basis weight (gsm) | 65 | 96 | 80 |
| Caliper (μm) | 70 | 75 | — |

TABLE 1-continued

|  | Sample 1-1 PE film* bag | Sample 1-2 PVA film* bag | Sample 1-3 paper* bag |
| --- | --- | --- | --- |
| WVTR (g/m²/day) | 72 | 855 | 1589 |
| Biodegradability | Non-Biodegradable | Biodegradable | Biodegradable |

PE film*: Polyethylene film from Innova (Lianbin) Co. Ltd.
PVA film*: Polyvinyl alcohol film, 2140C from Polye Material Co. Ltd.
Paper*: Kraft paper from The Pack Cooperation Several secondary packages are prepared. Outside dimensions of all secondary packages tested were 290 mm (length) by 190 mm (width) by 271 mm (height). Properties of several secondary packages and secondary package materials were measured according to methods under Test Methods herein, and indicated in Table 2.

TABLE 2

|  | Sample 2-1 Air-inflated film* package | Sample 2-2 corrugate box* | Sample 2-3 Film-coated corrugate box* |
| --- | --- | --- | --- |
| Basis weight (gsm) | 98 | 700 | 770 |
| Weight/package (g) | 73 | 297 | 341 |
| Puncture resistance (Joule) | 19.2 | 6.52 | 7.76 |
| Resistance to compression (N) | 195 | 2100 | 2375 |
| WVTR (g/m²/day) | 81 | Not measurable | Not measurable |
| Air tightness | ○ | X | X |

Air-inflated film*: Shanghai Air-Paq Composite Material Co., Ltd., China
Corrugate box*: Tianjin Shikaiwei, China
Film coated corrugate box*: PET film coated box from Tianjin Shikaiwei, China Sample 2-1 provides a low WVTR, and a high resistance to compression and a high puncture resistance which are desirable for a secondary package despite a low package weight.

Samples 2-2 and 2-3 have high basis weights and package weights. Both samples have high WVTR values as constituting package materials have open holes allowing moisture to freely transfer. Both Samples 2-2 and 2-3 exhibit low puncture resistances.

Example II. Package System

Various package systems indicated in Table 3 below were prepared.

Primary packages made by various primary package materials tested in Example I were prepared in such a way that each primary package contains 19 baby diapers, and heat-sealed.

Secondary packages, Samples 2-1, 2-2 and 2-3 tested in Example I were used in the test. Each secondary package contained two primary packages prepared above. After putting two primary packages into each secondary package, the secondary package was sealed. Sample 2-1 was heat-sealed, and Sample 2-2 and Sample 2-3 were tape-sealed in a conventional way.

Moisture pick-up values of a primary package containing diapers in the various package system were measured according to Moisture Pick-up Value Test disclosed herein, and are indicated in Table 3 below.

TABLE 3

| Package system | Primary package | Secondary package | Moisture pick-up value (%) |
|---|---|---|---|
| Example 1 | PE bag (Sample 1-1) | Corrugate box (tape-sealed in a conventional way) (Sample 2-2) | 0.1 |
| Example 2 | PVA bag (Sample 1-2) | Corrugate box (Sample 2-2) | 14.3 |
| Example 3 | Paper bag (Sample 1-3) | Corrugate box (Sample 2-2) | 13.6 |
| Example 4 | PVA bag (Sample1-2) | Film coated corrugate box (Sample 2-3) | 6.8 |
| Example 5 | PVA bag (Sample 1-2) | Air column box (Sample 2-1) | 1.3 |
| Example 6 | Paper bag (Sample 1-3) | Air column box (Sample 2-1) | 1.3 |

Example 1 employing a primary package made by a PE film and Examples 5 and 6 employing a sealed air column box has significantly low moisture pick-up value.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A system comprising:
   at least one primary package accommodating at least one article, the at least one primary package comprising a primary package material; and
   a secondary package accommodating the primary package;
   wherein the secondary package comprises a secondary package material having a water vapor transmission rate lower than 100 g/m²/day, as measured according to Water Vapor Transmission Rate Test, and a resistance to compression higher than about 150N, and
   wherein at least one of:
   the secondary package material has a lower water vapor transmission rate than the primary package material, as measured according to Water Vapor Transmission Rate; and
   the secondary package material has a basis weight that is greater than the primary package material.

2. The system according to claim 1, wherein the primary package material has a water vapor transmission rate higher than 200 g/m²/day, as measured according to Water Vapor Transmission Rate Test.

3. The system according to claim 1, wherein the primary package comprises a biodegradable material, a recyclable material, or a combination thereof and wherein the biodegradable material comprises a material selected from the group of aliphatic aromatic polyesters, thermoplastic starches, polybutylene succinate, polybutylene succinate copolymers, polycaptralactone, polyhydroxyalkoanates, polyhydroxyalkoanate copolymers, polylactic acid, polylactic acid copolymer, poly vinyl alcohol, poly vinyl alcohol copolymer, polyglycol acid, polypropylene carbonate, natural fibers, and combinations thereof.

4. The system according to claim 1, wherein the primary package comprises a top panel and a bottom panel or
   wherein the primary package has an MD tensile strength no less than about 0.55 N/mm, as measured according to Tensile Strength Test.

5. The system according to claim 1,
   wherein the secondary package has a puncture resistance higher than about 7 Joules, as measured according to Puncture Resistance Test, or
   wherein the secondary package material has a basis weight of from about 80 gsm to about 220 gsm.

6. The system according to claim 1, wherein the article is an absorbent article.

7. The system according to claim 1, wherein the primary package comprising at least one article exhibits a moisture pick-up less than 2%, as measured according to Moisture Pick-up Test.

8. The system according to claim 1, wherein the secondary package comprises plastic film that has a caliper no less than 40 μm.

9. The system according to claim 1, wherein the secondary package is a cuboid shape.

10. The system according to claim 1, wherein the secondary package comprises an air-inflated material comprising a plurality of air-inflated columns in a vertical direction when the secondary package is in a standing position.

11. The system according to claim 1, wherein the primary package comprises natural fibers and has a basis weight from about 50 gms to about 120 gsm.

12. The system according to claim 1, wherein the at least one article comprises a substantially inactivated wetness indicator.

13. The system according to claim 1, wherein the primary package comprises a recyclable material and the secondary package comprises a recyclable material, or
   wherein the primary package comprises a biodegradable material and the secondary package comprises a recyclable material.

14. The system according to claim 1, wherein the secondary package material is
   transparent or translucent such that a trademark or product information on a consumer-facing panel of the primary package is visible through the secondary package material.

15. The system according to claim 1, wherein the secondary package is self-standing without the primary package.

16. The system according to claim 1, wherein the secondary package forms a containing cavity with an open end and wherein the at least one primary package are configured to be inserted through the open end.

17. A system comprising:
at least one primary package accommodating at least one article, the at least one primary package comprising a primary package material; and
a secondary package accommodating the primary package;
wherein the secondary package comprises a secondary package material having a water vapor transmission rate lower than 100 g/m²/day, as measured according to Water Vapor Transmission Rate Test, and a resistance to compression higher than about 150N;
wherein the secondary package is self-standing without the primary package; and
wherein the primary package material comprises a recyclable material and the secondary package material comprises a recyclable material.

18. A system comprising:
a plurality of primary packages, each primary package accommodating a plurality of diapers, wherein each primary package comprises a plurality of panels including a consumer-facing panel that is designed to face a consumer and features a trademark or product information about the plurality of diapers;
a secondary package accommodating the plurality of primary packages, wherein the secondary package is self-standing without the plurality of primary packages, wherein the secondary package is configured to ship the plurality of primary packages and the plurality of diapers, wherein the secondary package comprises a secondary package material that is transparent or translucent such that the trademark or product information on the consumer-facing panel of one or more of the primary packages is visible through the secondary package material;
wherein each primary package comprises a primary package material that has a water vapor transmission rate greater than 200 g/m²/day, as measured according to Water Vapor Transmission Rate Test; and
wherein the secondary package material has a water vapor transmission rate lower than 100 g/m²/day, as measured according to the Water Vapor Transmission Rate Test, so to reduce moisture transfer through the secondary package material and the primary package material of each primary package to the plurality of diapers and reduce a likelihood of premature activation of wetness indicators on each of the plurality of diapers.

* * * * *